United States Patent
Suresh et al.

(10) Patent No.: US 8,238,255 B2
(45) Date of Patent: Aug. 7, 2012

(54) RECOVERING FROM FAILURES WITHOUT IMPACT ON DATA TRAFFIC IN A SHARED BUS ARCHITECTURE

(75) Inventors: Ravindran Suresh, Santa Clara, CA (US); Adoor V. Balasubramanian, Cupertino, CA (US)

(73) Assignee: Foundry Networks, LLC, San Jose, CA (US)

(*) Notice: Subject to any disclaimer, the term of this patent is extended or adjusted under 35 U.S.C. 154(b) by 168 days.

(21) Appl. No.: 11/831,950

(22) Filed: Jul. 31, 2007

(65) Prior Publication Data

US 2009/0279423 A1 Nov. 12, 2009

Related U.S. Application Data

(60) Provisional application No. 60/937,270, filed on Jun. 25, 2007, provisional application No. 60/860,882, filed on Nov. 22, 2006.

(51) Int. Cl.
*G06F 11/00* (2006.01)

(52) U.S. Cl. ........ 370/242; 370/216; 370/217; 719/318; 712/28

(58) Field of Classification Search .................. 370/216, 370/217, 242; 719/318; 712/28
See application file for complete search history.

(56) References Cited

U.S. PATENT DOCUMENTS

| | | | |
|---|---|---|---|
| 3,866,175 A | 2/1975 | Seifert, Jr. et al. |
| 4,325,119 A | 4/1982 | Grandmaison et al. |
| 4,348,725 A | 9/1982 | Farrell et al. |
| 4,628,480 A | 12/1986 | Floyd |
| 4,667,323 A | 5/1987 | Engdahl et al. |
| 4,683,564 A | 7/1987 | Young et al. |
| 4,698,748 A | 10/1987 | Juzswik et al. |
| 4,723,243 A | 2/1988 | Joshi et al. |
| 4,754,482 A | 6/1988 | Weiss |
| 4,791,629 A | 12/1988 | Burns et al. |
| 4,794,629 A | 12/1988 | Pastyr et al. |

(Continued)

FOREIGN PATENT DOCUMENTS

EP 1380127 A2 1/2004

(Continued)

OTHER PUBLICATIONS

Notice of Allowance for U.S. Appl. No. 09/988,066, Mailed Jan. 9, 2009, 13 pages.

(Continued)

*Primary Examiner* — Huy D Vu
*Assistant Examiner* — Omer Mian
(74) *Attorney, Agent, or Firm* — Kilpatrick Townsend & Stockton LLP

(57) ABSTRACT

Methods of detecting and recovering from communication failures within an operating network switching device that is switching packets in a communication network, and associated structures. The communication failures addressed involve communications between the packet processors and a host CPU over a shared communications bus, e.g., PCI bus. The affected packet processor(s)—which may be all or a subset of the packet processors of the network switch—may be recovered without affecting hardware packet forwarding through the affected packet processors. This maximizes the up time of the network switching device. Other packet processor(s), if any, of the network switching device, which are not affected by the communication failure, may continue their normal packet forwarding, i.e., hardware forwarding that does not involve communications with the host CPU as well as forwarding or other operations that do involve communications with the host CPU.

18 Claims, 6 Drawing Sheets

U.S. PATENT DOCUMENTS

| | | | |
|---|---|---|---|
| 4,807,280 A | 2/1989 | Posner et al. |
| 4,876,681 A | 10/1989 | Hagiwara et al. |
| 4,896,277 A | 1/1990 | Vercellotti et al. |
| 4,985,889 A | 1/1991 | Frankish et al. |
| 5,101,404 A | 3/1992 | Kunimoto et al. |
| 5,136,584 A | 8/1992 | Hedlund |
| 5,195,181 A | 3/1993 | Bryant et al. |
| 5,208,856 A | 5/1993 | Leduc et al. |
| 5,224,108 A | 6/1993 | McDysan et al. |
| 5,231,633 A | 7/1993 | Hluchyj et al. |
| 5,280,582 A | 1/1994 | Yang et al. |
| 5,282,196 A | 1/1994 | Clebowicz |
| 5,287,477 A | 2/1994 | Johnson et al. |
| 5,299,190 A | 3/1994 | LaMaire et al. |
| 5,299,195 A | 3/1994 | Shah |
| 5,301,192 A | 4/1994 | Henrion |
| 5,307,345 A | 4/1994 | Lozowick et al. |
| 5,323,386 A | 6/1994 | Wiher et al. |
| 5,365,512 A | 11/1994 | Combs et al. |
| 5,377,189 A | 12/1994 | Clark |
| 5,390,173 A | 2/1995 | Spinney et al. |
| 5,392,279 A | 2/1995 | Taniguchi |
| 5,406,643 A | 4/1995 | Burke et al. |
| 5,408,469 A | 4/1995 | Opher et al. |
| 5,430,442 A | 7/1995 | Kaiser et al. |
| 5,436,893 A | 7/1995 | Barnett |
| 5,461,615 A | 10/1995 | Henrion |
| 5,490,258 A | 2/1996 | Fenner |
| 5,506,840 A | 4/1996 | Pauwels et al. |
| 5,506,841 A | 4/1996 | Sandquist |
| 5,521,923 A | 5/1996 | Willmann et al. |
| 5,530,302 A | 6/1996 | Hamre et al. |
| 5,546,385 A | 8/1996 | Caspi et al. |
| 5,550,816 A | 8/1996 | Hardwick et al. |
| 5,563,948 A | 10/1996 | Diehl et al. |
| 5,566,170 A | 10/1996 | Bakke et al. |
| 5,598,410 A | 1/1997 | Stone |
| 5,600,795 A | 2/1997 | Du |
| 5,619,497 A | 4/1997 | Gallagher et al. |
| 5,640,504 A | 6/1997 | Johnson et al. |
| 5,646,878 A | 7/1997 | Samra |
| 5,663,952 A | 9/1997 | Gentry, Jr. |
| 5,663,959 A | 9/1997 | Nakagawa et al. |
| 5,666,353 A | 9/1997 | Klausmeier et al. |
| 5,721,819 A | 2/1998 | Galles et al. |
| 5,732,080 A | 3/1998 | Ferguson et al. |
| 5,734,826 A | 3/1998 | Olnowich et al. |
| 5,740,176 A | 4/1998 | Gupta et al. |
| 5,745,708 A | 4/1998 | Weppler et al. |
| 5,751,710 A | 5/1998 | Crowther et al. |
| 5,802,287 A | 9/1998 | Rostoker et al. |
| 5,815,146 A | 9/1998 | Youden et al. |
| 5,818,816 A | 10/1998 | Chikazawa et al. |
| 5,835,496 A | 11/1998 | Yeung et al. |
| 5,838,684 A | 11/1998 | Wicki et al. |
| 5,862,350 A | 1/1999 | Coulson |
| 5,864,555 A | 1/1999 | Mathur et al. |
| 5,867,675 A | 2/1999 | Lomelino et al. |
| 5,870,538 A | 2/1999 | Manning et al. |
| 5,872,769 A | 2/1999 | Caldara et al. |
| 5,872,783 A | 2/1999 | Chin |
| 5,875,200 A | 2/1999 | Glover et al. |
| 5,896,380 A | 4/1999 | Brown et al. |
| 5,907,566 A | 5/1999 | Benson et al. |
| 5,907,660 A | 5/1999 | Inoue et al. |
| 5,909,686 A | 6/1999 | Muller et al. |
| 5,915,094 A | 6/1999 | Kouloheris et al. |
| 5,920,566 A | 7/1999 | Hendel et al. |
| 5,920,886 A | 7/1999 | Feldmeier |
| 5,936,939 A | 8/1999 | Des Jardins et al. |
| 5,936,966 A | 8/1999 | Ogawa et al. |
| 5,956,347 A | 9/1999 | Slater |
| 5,999,528 A | 12/1999 | Chow et al. |
| 6,000,016 A | 12/1999 | Curtis et al. |
| 6,011,910 A | 1/2000 | Chau et al. |
| 6,016,310 A | 1/2000 | Muller et al. |
| 6,023,471 A | 2/2000 | Haddock et al. |
| 6,031,843 A | 2/2000 | Swanbery et al. |
| 6,035,414 A | 3/2000 | Okazawa et al. |
| 6,038,288 A | 3/2000 | Thomas et al. |
| 6,067,298 A | 5/2000 | Shinohara |
| 6,067,606 A | 5/2000 | Holscher et al. |
| 6,076,115 A | 6/2000 | Sambamurthy et al. |
| 6,081,522 A | 6/2000 | Hendle et al. |
| 6,088,356 A | 7/2000 | Hendel et al. |
| 6,094,434 A | 7/2000 | Kotzur et al. |
| 6,104,696 A | 8/2000 | Kadambi et al. |
| 6,104,700 A | 8/2000 | Haddock et al. |
| 6,108,306 A | 8/2000 | Kalkunte et al. |
| 6,118,787 A | 9/2000 | Kalkunte et al. |
| 6,125,417 A | 9/2000 | Bailis et al. |
| 6,128,666 A | 10/2000 | Muller et al. |
| 6,144,668 A | 11/2000 | Bass et al. |
| 6,147,996 A | 11/2000 | Laor et al. |
| 6,151,301 A | 11/2000 | Holden |
| 6,151,497 A | 11/2000 | Yee et al. |
| 6,154,446 A | 11/2000 | Kadambi et al. |
| 6,157,643 A | 12/2000 | Ma |
| 6,160,809 A | 12/2000 | Adiletta et al. |
| 6,160,812 A | 12/2000 | Bauman et al. |
| 6,172,990 B1 | 1/2001 | Deb et al. |
| 6,178,520 B1 * | 1/2001 | DeKoning et al. ............... 714/5 |
| 6,181,699 B1 | 1/2001 | Crinion et al. |
| 6,185,222 B1 | 2/2001 | Hughes |
| 6,195,335 B1 | 2/2001 | Calvignac et al. |
| 6,201,492 B1 | 3/2001 | Amar et al. |
| 6,212,586 B1 | 4/2001 | Mros et al. |
| 6,222,845 B1 | 4/2001 | Shue et al. |
| 6,243,667 B1 | 6/2001 | Kerr et al. |
| 6,249,528 B1 | 6/2001 | Kothary |
| 6,263,374 B1 | 7/2001 | Olnowich et al. |
| 6,272,144 B1 | 8/2001 | Berenbaum et al. |
| 6,304,903 B1 | 10/2001 | Ward |
| 6,320,859 B1 | 11/2001 | Momirov |
| 6,333,929 B1 | 12/2001 | Drottar et al. |
| 6,335,932 B2 | 1/2002 | Kadambi et al. |
| 6,335,935 B2 | 1/2002 | Kadambi et al. |
| 6,343,072 B1 | 1/2002 | Bechtolsheim et al. |
| 6,351,143 B1 | 2/2002 | Guccione et al. |
| 6,356,550 B1 | 3/2002 | Williams |
| 6,356,942 B1 | 3/2002 | Bengtsson et al. |
| 6,359,879 B1 | 3/2002 | Carvey et al. |
| 6,363,077 B1 | 3/2002 | Wong et al. |
| 6,366,557 B1 | 4/2002 | Hunter |
| 6,369,855 B1 | 4/2002 | Chauvel et al. |
| 6,421,352 B1 | 7/2002 | Manaka et al. |
| 6,424,658 B1 | 7/2002 | Mather |
| 6,424,659 B2 | 7/2002 | Viswanadham et al. |
| 6,427,185 B1 | 7/2002 | Ryals et al. |
| 6,430,190 B1 | 8/2002 | Essbaum et al. |
| 6,457,175 B1 | 9/2002 | Lerche |
| 6,459,705 B1 | 10/2002 | Cheng |
| 6,460,088 B1 | 10/2002 | Merchant |
| 6,463,063 B1 | 10/2002 | Bianchini, Jr. et al. |
| 6,466,608 B1 | 10/2002 | Hong et al. |
| 6,470,436 B1 | 10/2002 | Croft et al. |
| 6,473,428 B1 | 10/2002 | Nichols et al. |
| 6,473,433 B1 | 10/2002 | Bianchini, Jr. et al. |
| 6,477,174 B1 | 11/2002 | Dooley et al. |
| 6,480,477 B1 | 11/2002 | Treadaway et al. |
| 6,490,280 B1 | 12/2002 | Leung |
| 6,493,347 B2 | 12/2002 | Sindhu et al. |
| 6,496,502 B1 | 12/2002 | Fite et al. |
| 6,505,281 B1 | 1/2003 | Sherry |
| 6,510,138 B1 | 1/2003 | Pannell |
| 6,522,656 B1 | 2/2003 | Gridley |
| 6,532,229 B1 | 3/2003 | Johnson et al. |
| 6,532,234 B1 | 3/2003 | Yoshikawa |
| 6,535,504 B1 | 3/2003 | Johnson et al. |
| 6,549,519 B1 | 4/2003 | Michels et al. |
| 6,553,370 B1 | 4/2003 | Andreev et al. |
| 6,556,208 B1 | 4/2003 | Congdon et al. |
| 6,567,404 B1 | 5/2003 | Wilford |
| 6,570,884 B1 | 5/2003 | Connery et al. |
| 6,577,631 B1 | 6/2003 | Keenan et al. |
| 6,587,432 B1 | 7/2003 | Putzolu et al. |
| 6,591,302 B2 | 7/2003 | Boucher et al. |

| | | |
|---|---|---|
| 6,601,186 B1 | 7/2003 | Fox et al. |
| 6,606,300 B1 | 8/2003 | Blanc et al. |
| 6,628,650 B1 | 9/2003 | Saite et al. |
| 6,633,580 B1 | 10/2003 | Torudbakken et al. |
| 6,636,483 B1 | 10/2003 | Pannell |
| 6,643,269 B1 | 11/2003 | Fan et al. |
| 6,654,342 B1 | 11/2003 | Dittia et al. |
| 6,654,346 B1 | 11/2003 | Mahalingaiah et al. |
| 6,654,370 B1 | 11/2003 | Quirke et al. |
| 6,654,373 B1 | 11/2003 | Maher, III et al. |
| 6,658,002 B1 | 12/2003 | Ross et al. |
| 6,661,791 B1 | 12/2003 | Brown |
| 6,671,275 B1 | 12/2003 | Wong et al. |
| 6,678,248 B1 | 1/2004 | Haddock et al. |
| 6,681,332 B1 | 1/2004 | Byrne et al. |
| 6,683,872 B1 | 1/2004 | Saito |
| 6,687,217 B1 | 2/2004 | Chow et al. |
| 6,687,247 B1 | 2/2004 | Wilford et al. |
| 6,691,202 B2 | 2/2004 | Vasquez et al. |
| 6,696,917 B1 | 2/2004 | Heitner et al. |
| 6,697,359 B1 | 2/2004 | George |
| 6,697,368 B2 | 2/2004 | Chang et al. |
| 6,700,894 B1 | 3/2004 | Shung |
| 6,708,000 B1 | 3/2004 | Nishi et al. |
| 6,721,229 B1 | 4/2004 | Cole |
| 6,721,268 B1 | 4/2004 | Ohira et al. |
| 6,721,313 B1 | 4/2004 | Van Duyne |
| 6,721,338 B1 | 4/2004 | Sato |
| 6,731,875 B1 | 5/2004 | Kartalopoulos |
| 6,735,218 B2 | 5/2004 | Chang et al. |
| 6,745,277 B1 | 6/2004 | Lee et al. |
| 6,747,971 B1 | 6/2004 | Hughes et al. |
| 6,751,224 B1 | 6/2004 | Parruck et al. |
| 6,754,881 B2 | 6/2004 | Kuhlmann et al. |
| 6,765,866 B1 | 7/2004 | Wyatt |
| 6,775,706 B1 | 8/2004 | Fukumoto et al. |
| 6,778,546 B1 | 8/2004 | Epps et al. |
| 6,781,990 B1 | 8/2004 | Puri et al. |
| 6,785,290 B1 | 8/2004 | Fujisawa et al. |
| 6,788,697 B1 | 9/2004 | Aweya et al. |
| 6,792,484 B1 | 9/2004 | Hook |
| 6,792,502 B1 | 9/2004 | Pandya et al. |
| 6,798,740 B1 | 9/2004 | Senevirathne et al. |
| 6,804,220 B2 | 10/2004 | Odenwalder et al. |
| 6,804,731 B1 | 10/2004 | Chang et al. |
| 6,807,179 B1 | 10/2004 | Kanuri et al. |
| 6,807,363 B1 | 10/2004 | Abiko et al. |
| 6,810,038 B1 | 10/2004 | Isoyama et al. |
| 6,810,046 B2 | 10/2004 | Abbas et al. |
| 6,813,243 B1 | 11/2004 | Epps et al. |
| 6,813,266 B1 | 11/2004 | Chiang et al. |
| 6,816,467 B1 | 11/2004 | Muller et al. |
| 6,831,923 B1 | 12/2004 | Laor et al. |
| 6,831,932 B1 | 12/2004 | Boyle et al. |
| 6,836,808 B2 | 12/2004 | Bunce et al. |
| 6,839,346 B1 | 1/2005 | Kametani |
| 6,842,422 B1 | 1/2005 | Bianchini, Jr. |
| 6,854,117 B1 | 2/2005 | Roberts |
| 6,856,600 B1 | 2/2005 | Russell et al. |
| 6,859,438 B2 | 2/2005 | Haddock et al. |
| 6,865,153 B1 | 3/2005 | Hill et al. |
| 6,895,528 B1 | 5/2005 | Cantwell et al. |
| 6,901,072 B1 | 5/2005 | Wong |
| 6,906,936 B1 | 6/2005 | James et al. |
| 6,912,637 B1 | 6/2005 | Herbst |
| 6,920,154 B1 | 7/2005 | Aschler |
| 6,925,516 B2 | 8/2005 | Struhsaker et al. |
| 6,934,305 B1 | 8/2005 | Duschatko et al. |
| 6,937,606 B2 | 8/2005 | Basso et al. |
| 6,946,948 B2 | 9/2005 | McCormack et al. |
| 6,957,258 B2 | 10/2005 | Maher, III et al. |
| 6,959,007 B1 | 10/2005 | Vogel et al. |
| 6,973,092 B1 | 12/2005 | Zhou et al. |
| 6,975,599 B1 | 12/2005 | Johnson et al. |
| 6,978,309 B1 | 12/2005 | Dorbolo |
| 6,980,552 B1 | 12/2005 | Belz et al. |
| 6,982,974 B1 | 1/2006 | Saleh et al. |
| 6,990,102 B1 | 1/2006 | Kaniz et al. |
| 6,993,032 B1 | 1/2006 | Dammann et al. |
| 6,996,663 B1 | 2/2006 | Marsteiner |
| 7,005,812 B1 | 2/2006 | Mitchell |
| 7,009,968 B2 | 3/2006 | Ambe et al. |
| 7,012,919 B1 | 3/2006 | So et al. |
| 7,050,430 B2 | 5/2006 | Kalkunte et al. |
| 7,080,238 B2 | 7/2006 | Van Hoof et al. |
| 7,082,133 B1 | 7/2006 | Lor et al. |
| 7,103,041 B1 | 9/2006 | Speiser et al. |
| 7,120,744 B2 | 10/2006 | Klein |
| 7,126,948 B2 | 10/2006 | Gooch et al. |
| 7,126,956 B2 | 10/2006 | Scholten |
| 7,151,797 B2 | 12/2006 | Limberg |
| 7,161,948 B2 | 1/2007 | Sampath et al. |
| 7,167,471 B2 | 1/2007 | Calvignac et al. |
| 7,176,911 B1 | 2/2007 | Kidono et al. |
| 7,185,141 B1 | 2/2007 | James et al. |
| 7,185,266 B2 | 2/2007 | Blightman et al. |
| 7,187,687 B1 | 3/2007 | Davis et al. |
| 7,190,696 B1 | 3/2007 | Manur et al. |
| 7,191,277 B2 | 3/2007 | Broyles |
| 7,191,468 B2 | 3/2007 | Hanner |
| 7,203,194 B2 | 4/2007 | Chang et al. |
| 7,206,283 B2 | 4/2007 | Chang et al. |
| 7,212,536 B2 | 5/2007 | MacKiewich et al. |
| 7,218,637 B1 | 5/2007 | Best et al. |
| 7,219,293 B2 | 5/2007 | Tsai et al. |
| 7,228,509 B1 | 6/2007 | Dada et al. |
| 7,236,490 B2 | 6/2007 | Chang et al. |
| 7,237,058 B2 | 6/2007 | Srinivasan |
| 7,249,306 B2 | 7/2007 | Chen |
| 7,266,117 B1 | 9/2007 | Davis |
| 7,272,611 B1 | 9/2007 | Cuppett et al. |
| 7,272,613 B2 | 9/2007 | Sim et al. |
| 7,277,425 B1 | 10/2007 | Sikdar |
| 7,283,547 B1 | 10/2007 | Hook et al. |
| 7,286,534 B2 | 10/2007 | Kloth |
| 7,324,509 B2 | 1/2008 | Ni |
| 7,355,970 B2 | 4/2008 | Lor |
| 7,356,030 B2 | 4/2008 | Chang et al. |
| 7,366,100 B2 | 4/2008 | Anderson et al. |
| 7,391,769 B2 | 6/2008 | Rajkumar et al. |
| 7,428,693 B2 | 9/2008 | Obuchi et al. |
| 7,468,975 B1 | 12/2008 | Davis |
| 7,512,127 B2 | 3/2009 | Chang et al. |
| 7,558,193 B2 | 7/2009 | Bradbury et al. |
| 7,561,590 B1 | 7/2009 | Walsh |
| 7,609,617 B2 | 10/2009 | Appanna et al. |
| 7,613,991 B1 | 11/2009 | Bain |
| 7,649,885 B1 | 1/2010 | Davis et al. |
| 7,657,703 B1 | 2/2010 | Singh |
| 7,738,450 B1 | 6/2010 | Davis |
| 7,813,367 B2 | 10/2010 | Wong |
| 7,817,659 B2 | 10/2010 | Wong |
| 7,830,884 B2 | 11/2010 | Davis |
| 7,903,654 B2 | 3/2011 | Bansal |
| 7,933,947 B2 | 4/2011 | Fleischer et al. |
| 7,948,872 B2 | 5/2011 | Patel et al. |
| 7,953,922 B2 | 5/2011 | Singh |
| 7,953,923 B2 | 5/2011 | Singh |
| 8,014,278 B1 | 9/2011 | Subramanian et al. |
| 8,037,399 B2 | 10/2011 | Wong et al. |
| 2001/0001879 A1* | 5/2001 | Kubik et al. .................. 713/320 |
| 2001/0007560 A1 | 7/2001 | Masuda et al. |
| 2001/0026551 A1 | 10/2001 | Horlin |
| 2001/0048785 A1 | 12/2001 | Steinberg |
| 2001/0053150 A1 | 12/2001 | Clear et al. |
| 2002/0001307 A1 | 1/2002 | Nguyen et al. |
| 2002/0040417 A1 | 4/2002 | Winograd et al. |
| 2002/0054594 A1 | 5/2002 | Hoof et al. |
| 2002/0054595 A1 | 5/2002 | Ambe et al. |
| 2002/0069294 A1 | 6/2002 | Herkersdorf et al. |
| 2002/0073073 A1 | 6/2002 | Cheng |
| 2002/0085499 A1 | 7/2002 | Toyoyama et al. |
| 2002/0087788 A1 | 7/2002 | Morris |
| 2002/0089937 A1 | 7/2002 | Venkatachary et al. |
| 2002/0089977 A1 | 7/2002 | Chang et al. |
| 2002/0091844 A1 | 7/2002 | Craft et al. |
| 2002/0091884 A1 | 7/2002 | Chang et al. |
| 2002/0105966 A1 | 8/2002 | Patel et al. |

| | | |
|---|---|---|
| 2002/0126672 A1 | 9/2002 | Chow et al. |
| 2002/0131437 A1 | 9/2002 | Tagore-Brage |
| 2002/0141403 A1 | 10/2002 | Akahane et al. |
| 2002/0146013 A1 | 10/2002 | Karlsson et al. |
| 2002/0161967 A1 | 10/2002 | Kirihata et al. |
| 2002/0169786 A1 | 11/2002 | Richek |
| 2002/0191605 A1 | 12/2002 | Van Lunteren et al. |
| 2003/0009466 A1 | 1/2003 | Ta et al. |
| 2003/0012198 A1 | 1/2003 | Kaganoi et al. |
| 2003/0043800 A1 | 3/2003 | Sonksen et al. |
| 2003/0043848 A1 | 3/2003 | Sonksen |
| 2003/0061459 A1 | 3/2003 | Aboulenein et al. |
| 2003/0074657 A1 | 4/2003 | Bramley, Jr. |
| 2003/0081608 A1 | 5/2003 | Barri et al. |
| 2003/0095548 A1 | 5/2003 | Yamano |
| 2003/0103499 A1 | 6/2003 | Davis et al. |
| 2003/0103500 A1 | 6/2003 | Menon et al. |
| 2003/0108052 A1 | 6/2003 | Inoue et al. |
| 2003/0110180 A1 | 6/2003 | Calvignac et al. |
| 2003/0115403 A1 | 6/2003 | Bouchard et al. |
| 2003/0120861 A1 | 6/2003 | Calle et al. |
| 2003/0128668 A1 | 7/2003 | Yavatkar et al. |
| 2003/0137978 A1 | 7/2003 | Kanetake |
| 2003/0152084 A1 | 8/2003 | Lee et al. |
| 2003/0152096 A1 | 8/2003 | Chapman |
| 2003/0156586 A1 | 8/2003 | Lee et al. |
| 2003/0159086 A1* | 8/2003 | Arndt ............................... 714/25 |
| 2003/0165160 A1 | 9/2003 | Minami et al. |
| 2003/0169470 A1 | 9/2003 | Alagar et al. |
| 2003/0177221 A1 | 9/2003 | Ould-Brahim et al. |
| 2003/0198182 A1 | 10/2003 | Pegrum et al. |
| 2003/0200343 A1 | 10/2003 | Greenblat et al. |
| 2003/0214956 A1 | 11/2003 | Navada et al. |
| 2003/0223424 A1 | 12/2003 | Anderson et al. |
| 2003/0223466 A1 | 12/2003 | Noronha, Jr. et al. |
| 2003/0227943 A1 | 12/2003 | Hallman et al. |
| 2004/0022263 A1 | 2/2004 | Zhao et al. |
| 2004/0028060 A1 | 2/2004 | Kang |
| 2004/0054867 A1 | 3/2004 | Stravers et al. |
| 2004/0062245 A1 | 4/2004 | Sharp et al. |
| 2004/0062246 A1 | 4/2004 | Boucher et al. |
| 2004/0088469 A1 | 5/2004 | Levy |
| 2004/0128434 A1 | 7/2004 | Khanna et al. |
| 2004/0141504 A1 | 7/2004 | Blanc |
| 2004/0179548 A1 | 9/2004 | Chang et al. |
| 2004/0190547 A1 | 9/2004 | Gordy et al. |
| 2004/0208177 A1 | 10/2004 | Ogawa |
| 2004/0208181 A1 | 10/2004 | Clayton et al. |
| 2004/0223502 A1 | 11/2004 | Wybenga et al. |
| 2004/0235480 A1 | 11/2004 | Rezaaifar et al. |
| 2004/0264380 A1 | 12/2004 | Kalkunte et al. |
| 2005/0010630 A1 | 1/2005 | Doering et al. |
| 2005/0010849 A1 | 1/2005 | Ryle et al. |
| 2005/0041684 A1 | 2/2005 | Reynolds et al. |
| 2005/0089049 A1 | 4/2005 | Chang et al. |
| 2005/0097432 A1 | 5/2005 | Obuchi et al. |
| 2005/0120122 A1 | 6/2005 | Farnham |
| 2005/0132132 A1 | 6/2005 | Rosenbluth et al. |
| 2005/0132179 A1 | 6/2005 | Glaum et al. |
| 2005/0138276 A1 | 6/2005 | Navada et al. |
| 2005/0144369 A1 | 6/2005 | Jaspers |
| 2005/0152324 A1 | 7/2005 | Benveniste |
| 2005/0152335 A1* | 7/2005 | Lodha et al. .................. 370/351 |
| 2005/0169317 A1 | 8/2005 | Pruecklmayer |
| 2005/0175018 A1 | 8/2005 | Wong |
| 2005/0185577 A1 | 8/2005 | Sakamoto et al. |
| 2005/0185652 A1 | 8/2005 | Iwamoto |
| 2005/0193316 A1 | 9/2005 | Chen |
| 2005/0201387 A1 | 9/2005 | Willis |
| 2005/0226236 A1 | 10/2005 | Klink |
| 2005/0246508 A1 | 11/2005 | Shaw |
| 2005/0249124 A1 | 11/2005 | Elie-Dit-Cosaque et al. |
| 2006/0031610 A1 | 2/2006 | Liav et al. |
| 2006/0034452 A1 | 2/2006 | Tonomura et al. |
| 2006/0050690 A1 | 3/2006 | Epps et al. |
| 2006/0077891 A1 | 4/2006 | Smith et al. |
| 2006/0092829 A1 | 5/2006 | Brolin et al. |
| 2006/0092929 A1 | 5/2006 | Chun |
| 2006/0114876 A1 | 6/2006 | Kalkunte |
| 2006/0146374 A1 | 7/2006 | Ng et al. |
| 2006/0165089 A1 | 7/2006 | Klink |
| 2006/0209685 A1 | 9/2006 | Rahman et al. |
| 2006/0221841 A1 | 10/2006 | Lee et al. |
| 2006/0268680 A1 | 11/2006 | Roberts et al. |
| 2007/0038798 A1 | 2/2007 | Bouchard et al. |
| 2007/0088974 A1* | 4/2007 | Chandwani et al. ............... 714/6 |
| 2007/0127464 A1 | 6/2007 | Jain et al. |
| 2007/0179909 A1 | 8/2007 | Channasagara |
| 2007/0208876 A1 | 9/2007 | Davis |
| 2007/0253420 A1 | 11/2007 | Chang et al. |
| 2007/0258475 A1 | 11/2007 | Chinn et al. |
| 2007/0288690 A1 | 12/2007 | Wang et al. |
| 2008/0002707 A1 | 1/2008 | Davis |
| 2008/0031263 A1 | 2/2008 | Ervin et al. |
| 2008/0037544 A1 | 2/2008 | Yano et al. |
| 2008/0049742 A1 | 2/2008 | Bansal |
| 2008/0069125 A1* | 3/2008 | Reed et al. .................... 370/410 |
| 2008/0092020 A1 | 4/2008 | Hasenplaugh et al. |
| 2008/0095169 A1 | 4/2008 | Chandra et al. |
| 2008/0117075 A1 | 5/2008 | Seddigh et al. |
| 2008/0126652 A1* | 5/2008 | Vembu et al. ................. 710/268 |
| 2008/0181103 A1 | 7/2008 | Davies |
| 2008/0205407 A1 | 8/2008 | Chang et al. |
| 2008/0307288 A1 | 12/2008 | Ziesler et al. |
| 2009/0175178 A1 | 7/2009 | Yoon et al. |
| 2010/0034215 A1 | 2/2010 | Patel et al. |
| 2010/0046521 A1 | 2/2010 | Wong |
| 2010/0061393 A1 | 3/2010 | Wong |
| 2010/0100671 A1 | 4/2010 | Singh |
| 2010/0135313 A1 | 6/2010 | Davis |
| 2010/0161894 A1 | 6/2010 | Singh |
| 2010/0246588 A1 | 9/2010 | Davis |
| 2010/0293327 A1 | 11/2010 | Lin et al. |
| 2011/0002340 A1 | 1/2011 | Davis |
| 2011/0044340 A1 | 2/2011 | Bansal et al. |
| 2011/0069711 A1 | 3/2011 | Jha et al. |
| 2011/0110237 A1 | 5/2011 | Wong et al. |

FOREIGN PATENT DOCUMENTS

| | | |
|---|---|---|
| JP | 2003-289359 A | 10/2003 |
| JP | 2004-537871 T | 12/2004 |
| WO | WO 01/84728 A1 | 11/2001 |
| WO | WO 02/041544 A2 | 5/2002 |

OTHER PUBLICATIONS

Non-Final Office Action for U.S. Appl. No. 11/668,322, Dated Mar. 23, 2009, 19 pages.
Non-Final Office Action for U.S. Appl. No. 10/832,086, Mailed Apr. 1, 2009, 17 pages.
U.S. Appl. No. 12/400,594, filed Mar. 9, 2009, Patel et al.
U.S. Appl. No. 12/400,645, filed Mar. 9, 2009, Patel et al.
U.S. Appl. No. 12/372,390, filed Feb. 17, 2009, Chang et al.
U.S. Appl. No. 12/417,913, filed Apr. 3, 2009, Patel et al.
Final Office Action for U.S. Appl. No. 10/140,751, Mailed Mar. 17, 2009, 17 pages.
Non-Final Office Action for U.S. Appl. No. 11/615,769, Mailed Apr. 15, 2009, 11 pages.
Non-Final Office Action for U.S. Appl. No. 11/621,038, Mailed Apr. 23, 2009, 44 pages.
Non-Final Office Action for U.S. Appl. No. 11/745,008, Mailed May 14, 2009, 27 pages.
Non Final Office Action U.S. Appl. No. 11/804,977, Mailed Jan. 14, 2008, 13 pages.
Notice of Allowance for U.S. Appl. No. 11/804,977, Mailed Nov. 19, 2008, 17 pages.
U.S. Appl. No. 11/828,246, filed Jul. 25, 2007, Davis.
U.S. Appl. No. 11/779,778, filed Jul. 18, 2007, Wong et al.
U.S. Appl. No. 11/779,714, filed Jul. 18, 2007, Wong et al.
U.S. Appl. No. 11/724,965.
U.S. Appl. No. 11/621,038, filed Jan. 8, 2007, Davis et al.
U.S. Appl. No. 11/586,991, filed Oct. 25, 2006, Ramanathan.
U.S. Appl. No. 11/118,697, filed Apr. 28, 2005, Singh.
U.S. Appl. No. 11/953,742, filed Dec. 10, 2007, Wong et al.
U.S. Appl. No. 11/953,743, filed Dec. 10, 2007, Wong et al.

U.S. Appl. No. 11/953,745, filed Dec. 10, 2007, Wong et al.
U.S. Appl. No. 11/953,751, filed Dec. 10, 2007, Wong et al.
U.S. Appl. No. 10/141,223, filed May 7, 2002, Veerabadran et al.
U.S. Appl. No. 10/140,753, filed May 6, 2002, Davis et al.
U.S. Appl. No. 10/140,752, filed May 6, 2002, Davis.
U.S. Appl. No. 10/140,751, filed May 6, 2002, Davis et al.
U.S. Appl. No. 10/140,749, filed May 6, 2002, Davis et al.
U.S. Appl. No. 10/139,912, filed May 6, 2002, Davis et al.
U.S. Appl. No. 10/810,208, filed Mar. 26, 2004, Wong et al.
U.S. Appl. No. 10/832,086, filed Apr. 26, 2004, Wong.
Belhadj et al., "Feasibility of a 100GE MAC", IEEE Meeting Nov. 2006, 18 pages.
Braun et al., "Fast incremental CRC updates for IP over ATM networks," IEEE Workshop on High Performance Switching and Routing, 2001, pp. 48-52.
International Search Report of Jun. 17, 2003 for application No. PCT/US03/08719.
10 Gigabit Ethernet—Technology Overview White Paper, Sep. 2001, 16 pages.
10 Gigabit Ethernet Alliance, Interconnection with Wide Area Networks, Version 1.0, Mar. 2002, 5 pages.
Degermark, M., et al., "Small Forwarding Tables for Fast Routing Lookups," *ACM Computer Communications Review*, 27(4):3-14, Oct. 1997.
Foundry Networks, "BigIron Architecture Technical Brief," Oct. 1998—Version 1.0, 15 pages.
Foundry Networks, "BigIron Architecture Technical Brief," Oct. 1998—Version 1.02, 15 pages.
Foundry Networks, "BigIron Architecture Technical Brief," Dec. 1998—Version 1.03, 14 pages.
Foundry Networks, "BigIron Architecture Technical Brief," May 1999—Version 2.0, 15 pages.
Foundry Networks, "BigIron Architecture Technical Brief," May 1999—Version 2.01, 15 pages.
Foundry Networks, "BigIron Architecture Technical Brief," Jul. 2001—Version 2.02, 16 pages.
Foundry Networks, Foundry Networks, "Next Generation Terabit System Architecture—The High Performance Revolution for 10 Gigabit Networks," Nov. 17, 2003.
Gigabit Ethernet Alliance—"Accelerating the Standard for Speed," Copyright 1998, 10 pages.
Kichorowsky et al., "Mindspeed.TM. Switch Fabric Offers the Most Comprehensive Solution for Multi-Protocol Networking Equipment," Apr. 30, 2001, 3 pages.
Matsumoto et al., "Switch Fabrics Touted At Interconnects Conference," Aug. 21, 2000, URL=http://www.eetimes.com/story/OEG20000821S0011, accessed Aug. 12, 2002, 2 pages.
Mcauley et al., "Fast Routing Table Lookup Using CAMs," Proceedings of INFOCOM, Mar.-Apr. 1993, pp. 1382-1391.
Foundry Networks, "JetCore™ Based Chassis Systems—An Architecture Brief on NetIron, BigIron, and FastIron Systems," Jan. 17, 2003.
Mier Communications, Inc., "Lab Testing Summary Report—Product Category: Layer-3 Switches, Vendor Tested:, Product Tested: Foundry Networks, BigIron 4000," Report No. 231198, Oct. 1998, 6 pages.
Mier Communications, Inc.,"Lab Testing Summary Report—Product Category: Gigabit Backbone Switches, Vendor Tested: Foundry Networks, Product Tested: BigIron 4000," Report No. 210998, Sep. 1998, 6 pages.
Mindspeed—A Conexant Business, "Switch Fabric Chipset—CX27300 iScale.TM.," Apr. 30, 2001, 2 pages.
Mindspeed—A Conexant Business, "17×17 3.2 Gbps Crosspoint Switch with Input Equalization—M21110," Feb. 1, 2001, 2 pages.
The Tolly Group, "Foundry Networks, Inc.—BigIron 4000, Layer 2 & Layer 3 Interoperability Evaluation," No. 199133, Oct. 1999, 4 pages.
The Tolly Group, "Foundry Networks, Inc.—BigIron 8000 Gigabit Ethernet Switching Router, Layer 2 & Layer 3 Performance Evaluation," No. 199111, May 1999, 4 pages.
Satran et al., "Out of Order Incremental CRC Computation," *IEEE Transactions on Computers*, 54(9): 1178-1181 (Sep. 2005).

Spurgeon, C., "Éthernet, The Definitive Guide," O'Reilly & Associates, Inc., Sebastapol, CA, Feb. 2000.
ANSI/IEEE Standard 802.1D, 1998 Edition (373 pages).
Newton, Newton's Telecom Dictionary, CMP Books, Mar. 2004, 20th Ed., p. 617.
International Preliminary Examination Report for Application No. PCT/US2001/043113, mailed Nov. 6, 2003, 6pages.
Written Opinion of the International Searching Authority for Application No. PCT/US2001/043113, mailed May 1, 2003, 6 pages.
International Search Report for Application No. PCT/US2001/043113, mailed Dec. 13, 2002, 2 pages.
Non-Final Office Action for U.S. Appl. No. 09/855,024. mailed Jun. 4, 2002, 10 pages.
Final Office Action for U.S. Appl. No. 09/855,024, mailed Jan. 15, 2003, 20 pages.
Advisory Action for U.S. Appl. No. 09/855,024, mailed May 2, 2003.
Notice of Allowance for U.S. Appl. No. 09/855,024, mailed Nov. 3, 2003.
Notice of Allowance for U.S. Appl. No. 09/855,024, mailed Dec. 15, 2003. 6 pages.
Non-Final Office Action for U.S. Appl. No. 10/810,301, mailed Mar. 17, 2005,11 pages.
Non-Final Office Action for U.S. Appl. No. 10/810,301, mailed Feb. 16, 2006, 12 pages.
Notice of Allowance for U.S. Appl. No. 10/810,301, mailed Jul. 28, 2006, 5 pages.
Notice of Allowance for U.S. Appl. No. 10/810,301, mailed Feb. 6, 2007, 9 pages.
Non-Final Office Action for U.S. Appl. No. 09/855,025, mailed Nov. 23, 2004, 17 pages.
Non-Final Office Action for U.S. Appl. No. 09/855,031, mailed May 22, 2002.
Non-Final Office Action for U.S. Appl. No. 09/855,031, mailed Dec. 10, 2002.
Final Office Action for U.S. Appl. No. 09/855,031, mailed Jul. 30, 2003.
Notice of Allowance for U.S. Appl. No. 09/855,031, mailed Nov. 4, 2003.
Non-Final Office Action for U.S. Appl. No. 10/736,680, mailed Feb. 16, 2006, 18 pages.
Final Office Action for U.S. Appl. No. 10/736,680, mailed Aug. 3, 2006, 10 pages.
Notice of Allowance for U.S. Appl. No. 10/736,680, mailed Feb. 22, 2007, 12 pages.
Non-Final Office Action for U.S. Appl. No. 10/210,041, mailed Sep. 10, 2003, 12 pages.
Final Office Action for U.S. Appl. No. 10/210,041, mailed Jan. 7, 2004, 14 pages.
Non-Final Office Action for U.S. Appl. No. 10/210,041, mailed Mar. 11, 2004, 12 pages.
Final Office Action for U.S. Appl. No. 10/210,041, mailed Jul. 7, 2004, 13 pages.
Non-Final Office Action for U.S. Appl. No. 10/210,041, mailed Feb. 9, 2005, 7 pages.
Final Office Action for U.S. Appl. No. 10/210,041, mailed Aug. 24, 2005, 7 pages.
Advisory Action for U.S. Appl. No. 10/210,041, mailed Dec. 13, 2005, 4 pages.
Non-Final Office Action for U.S. Appl. No. 10/210,108, mailed Jun. 12, 2003, 6 pages.
Notice of Allowance for U.S. Appl. No. 10/210,108, mailed Oct. 7, 2003.
Requirement for Restriction/Election for U.S. Appl. No. 10/438,545, mailed Oct. 31, 2003.
Non-Final Office Action for U.S. Appl. No. 10/438,545, mailed Dec. 12, 2003, 7 pages.
Notice of Allowance for U.S. Appl. No. 10/438,545, mailed Jun. 15, 2004, 4 pages.
Non-Final Office Action for U.S. Appl. No. 11/611,067, mailed Feb. 20, 2009, 11 pages.
Non-Final Office Action for U.S. Appl. No. 10/832,086, mailed Sep. 19, 2007, 12 pages.

Final Office Action for U.S. Appl. No. 10/832,086, mailed May 1, 2008, 31 pages.
Advisory Action for U.S. Appl. No. 10/832,086, mailed Jul. 21, 2008, 4 pages.
Non-Final Office Action for U.S. Appl. No. 10/832,086, mailed Sep. 18, 2008, 18 pages.
Non-Final Office Action for U.S. Appl. No. 11/586,991, mailed Oct. 2, 2008, 23 pages.
Non-Final Office Action for U.S. Appl. No. 10/810,208, mailed Jul. 16, 2007, 24 pages.
Non-Final Office Action for U.S. Appl. No. 10/810,208, mailed Dec. 18, 2007, 40 pages.
Final Office Action for U.S. Appl. No. 10/810,208, mailed Jun. 11, 2008, 34 pages.
Advisory Action for U.S. Appl. No. 10/810,208, mailed Aug. 27, 2008, 4 pages.
Non-Final Office Action for U.S. Appl. No. 10/810,208, mailed Feb. 13, 2009, 17 pages.
Requirement for Restriction/Election for U.S. Appl. No. 10/140,752, mailed May 18, 2006, 8 pages.
Non-Final Office Action for U.S. Appl. No. 10/140,752, mailed Dec. 14, 2006, 17 pages.
Non-Final Office Action for U.S. Appl. No. 10/140,752, mailed Apr. 23, 2007, 6 pages.
Non-Final Office Action for U.S. Appl. No. 10/140,752, mailed Jan. 24, 2008, 8 pages.
Notice of Allowance of U.S. Appl. No. 10/140,752, mailed Jul. 24, 2008, 14 pages.
Notice of Allowance of U.S. Appl. No. 10/140,752, mailed Sep. 10, 2008, 4 pages.
Non-Final Office Action for U.S. Appl. No. 11/854,486, mailed Jul. 20, 2009, 29 pages.
Non-Final Office Action for U.S. Appl. No. 10/139,912, mailed Jan. 25, 2006, 14 pages.
Final Office Action for U.S. Appl. No. 10/139,912, mailed Aug. 11, 2006, 26 pages.
Non-Final Office Action for U.S. Appl. No. 10/139,912, mailed Apr. 20, 2007, 20 pages.
Final Office Action for U.S. Appl. No. 10/139,912, mailed Nov. 28, 2007, 20 pages.
Non-Final Office Action for U.S. Appl. No. 10/139,912, mailed Aug. 1, 2008, 21 pages.
Notice of Allowance for U.S. Appl. No. 10/139,912, mailed Feb. 5, 2009, 8 pages.
Notice of Allowance for U.S. Appl. No. 10/139,912, mailed Jun. 8, 2009, 8 pages.
Requirement for Restriction/Election for U.S. Appl. No. 10/140,751, mailed Apr. 27, 2006, 5 pages.
Non-Final Office Action for U.S. Appl. No. 10/140,751, mailed Aug. 10, 2006, 15 pages.
Final Office Action for U.S. Appl. No. 10/140,751, mailed Apr. 10, 2007, 16 pages.
Non-Final Office Action for U.S. Appl. No. 10/140,751, mailed Oct. 30, 2007, 14 pages.
Final Office Action for U.S. Appl. No. 10/140,751, mailed May 28, 2008, 19 pages.
Non-Final Office Action for U.S. Appl. No. 10/140,751, mailed Sep. 17, 2008, 15 pages.
Advisory Action for U.S. Appl. No. 10/140,751, mailed Jun. 1, 2009, 3 pages.
Non-Final Office Action for U.S. Appl. No. 10/141,223, mailed Feb. 23, 2006, 25 pages.
Non-Final Office Action for U.S. Appl. No. 10/141,223, mailed Feb. 13, 2007, 29 pages.
Final Office Action for U.S. Appl. No. 10/141,223, mailed Aug. 21, 2007, 25 pages.
Non-Final Office Action for U.S. Appl. No. 10/141,223, mailed Dec. 28, 2007, 13 pages.
Non-Final Office Action for U.S. Appl. No. 10/141,223, mailed Sep. 3, 2008, 22 pages.
Non-Final Office Action for U.S. Appl. No. 10/139,831, mailed Oct. 17, 2005, 7 pages.
Notice of Allowance for U.S. Appl. No. 10/139,831, mailed Feb. 9, 2006, 7 pages.
Non-Final Office Action for U.S. Appl. No. 10/139,831, mailed Jun. 27, 2006, 9 pages.
Final Office Action for U.S. Appl. No. 10/139,831, mailed Nov. 28, 2006, 17 pages.
Notice of Allowance for U.S. Appl. No. 10/139,831, mailed Jun. 14, 2007, 26 pages.
Notice of Allowance for U.S. Appl. No. 10/139,831, mailed Jun. 26, 2007, 25 pages.
Non-Final Office Action for U.S. Appl. No. 11/828,246, mailed Jun. 15, 2009, 26 pages.
Non-Final Office Action for U.S. Appl. No. 10/140,088, mailed Apr. 27, 2006, 13 pages.
Notice of Allowance for U.S. Appl. No. 10/140,088, mailed Sep. 7, 2006, 13 pages.
Notice of Allowance for U.S. Appl. No. 10/140,088, mailed Oct. 24, 2006, 8 pages.
Notice of Allowance for U.S. Appl. No. 10/140,088, mailed Jan. 11, 2007, 5 pages.
Non-Final Office Action for U.S. Appl. No. 10/140,749, mailed Aug. 10, 2006, 22 pages.
Final Office Action for U.S. Appl. No. 10/140,749, mailed Jun. 27, 2007, 23 pages.
Final Office Action for U.S. Appl. No. 10/140,749, mailed Jan. 8, 2008, 23 pages.
Non-Final Office Action for U.S. Appl. No. 10/140,749, mailed Jun. 6, 2008, 28 pages.
Final Office Action for U.S. Appl. No. 10/140,749, mailed Dec. 8, 2008, 30 pages.
Non-Final Office Action for U.S. Appl. No. 10/140,749, mailed May 27, 2009, 38 pages.
Non-Final Office Action for U.S. Appl. No. 10/140,753, mailed Apr. 20, 2006, 11 pages.
Final Office Action for U.S. Appl. No. 10/140,753, mailed Jan. 10, 2007, 27 pages.
Non-Final Office Action for U.S. Appl. No. 10/140,753, mailed Aug. 22, 2007, 14 pages.
Non-Final Office Action for U.S. Appl. No. 10/140,753, mailed Jan. 8, 2008, 14 pages.
Final Office Action for U.S. Appl. No. 10/140,753, mailed Aug. 25, 2008, 22 pages.
Requirement for Restriction/Election for U.S. Appl. No. 11/000,359, mailed Jun. 20, 2008, 7 pages.
Non-Final Office Action for U.S. Appl. No. 11/000,359, mailed Oct. 23, 2008, 28 pages.
Non-Final Office Action for U.S. Appl. No. 11/000,359, mailed May 29, 2009, 14 pages.
Requirement for Restriction/Election for U.S. Appl. No. 11/118,697, mailed Jun. 2, 2009, 8 pages.
Non-Final Office Action for U.S. Appl. No. 09/855,038, mailed Jun. 2, 2005, 14 pages.
Final Office Action for U.S. Appl. No. 09/855,038, mailed Feb. 7, 2006, 8 pages.
Non-Final Office Action for U.S. Appl. No. 09/855,038, mailed Oct. 4, 2006, 14 pages.
Notice of Allowance for U.S. Appl. No. 09/855,038, mailed Apr. 26, 2007, 8 pages.
Requirement for Restriction/Election for U.S. Appl. No. 09/988,066, mailed Dec. 13, 2005, 7 pages.
Non-Final Office Action for U.S. Appl. No. 09/988,066, mailed Jul. 14, 2006, 17 pages.
Non-Final Office Action for U.S. Appl. No. 09/988,066, mailed Apr. 6, 2007, 22 pages.
Final Office Action for U.S. Appl. No. 09/988,066, mailed Oct. 31, 2007, 16 pages.
Advisory Action for U.S. Appl. No. 09/988,066, mailed May 28, 2008, 4 pages.
Notice of Allowance for U.S. Appl. No. 09/988,066, mailed Oct. 30, 2008, 16 pages.
Non-Final Office Action for U.S. Appl. No. 09/855,015, mailed Oct. 28, 2004, 12 pages.

Non-Final Office Action for U.S. Appl. No. 09/855,015, mailed Jan. 12, 2006, 6 pages.
Notice of Allowance for U.S. Appl. No. 09/855,015, mailed Sep. 8, 2006, 3 pages.
Requirement for Restriction/Election for U.S. Appl. No. 09/855,015, mailed Nov. 3, 2006, 6 pages.
Notice of Allowance for U.S. Appl. No. 09/855,015, mailed Jan. 7, 2008, 4 pages.
Supplemental Notice of Allowance for U.S. Appl. No. 09/855,015, mailed Feb. 4, 2008, 3 pages.
U.S. Appl. No. 12/198,697, filed Aug. 26, 2008, Hsu et al.
U.S. Appl. No. 12/505,390, filed Jul. 17, 2009, Patel et al.
Final Office Action for U.S. Appl. No. 10/832,086, mailed on Sep. 29, 2009, 26 pages.
Non-Final Office Action for U.S. Appl. No. 11/779,714, mailed on Sep. 1, 2009, 58 pages.
Non-Final Office Action for U.S. Appl. No. 10/810,208, mailed on Aug. 24, 2009, 38 pages.
Non-Final Office Action for U.S. Appl. No. 10/140,751, mailed on Sep. 28, 2009, 34 pages.
Notice of Allowance for U.S. Appl. No. 11/000,359, mailed on Sep. 22, 2009, 17 pages.
Notice of Allowance for U.S. Appl. No. 11/118,697, mailed on Sep. 30, 2009, 41 pages.
Non-Final Office Action for U.S. Appl. No. 11/953,742, mailed on Nov. 19, 2009, 51 pages.
Non-Final Office Action for U.S. Appl. No. 11/953,743, mailed on Nov. 23, 2009, 47 pages.
Non-Final Office Action for U.S. Appl. No. 11/953,745, mailed on Nov. 24, 2009, 48 pages.
Non-Final Office Action for U.S. Appl. No. 11/953,751, mailed on Nov. 16, 2009, 55 pages.
Requirement for Restriction/Election for U.S. Appl. No. 11/668,322, mailed on Oct. 29, 2009, 6 pages.
Notice of Allowance for U.S. Appl. No. 10/139,912, mailed on Oct. 19, 2009, 17 pages.
Notice of Allowance for U.S. Appl. No. 10/139,912, mailed on Nov. 23, 2009, 4 pages.
Final Office Action for U.S. Appl. No. 11/745,008, mailed on Dec. 30, 2009, 27 pages.
Notice of Allowance for U.S. Appl. No. 11/828,246, mailed on Nov. 16, 2009, 20 pages.
Final Office Action for U.S. Appl. No. 11/621,038, mailed on Dec. 23, 2009, 27 pages.
Final Office Action for U.S. Appl. No. 11/611,067, mailed on Oct. 16, 2009, 35 pages.
Non-Final Office Action for U.S. Appl. No. 11/611,067, mailed on Dec. 8, 2009, 11 pages.
U.S. Appl. No. 12/880,518, filed Sep. 13, 2010, Wong.
Non-Final Office Action for U.S. Appl. No. 10/140,751, Dec. 20, 2010, 23 pages.
Notice of Allowance for U.S. Appl. No. 12/400,645, mailed on Jan. 26, 2011, 14 pages.
Non-Final Office Action for U.S. Appl. No. 11/953,742, mailed on Mar. 30, 2011, 23 pages.
Non-Final Office Action for U.S. Appl. No. 11/953,751, mailed on Mar. 29, 2011, 29 pages.
Non-Final Office Action for U.S. Appl. No. 11/779,778, mailed on Feb. 2, 2011, 63 pages.
Final Office Action for U.S. Appl. No. 11/668,322, mailed on Feb. 1, 2011, 17 pages.
Non-Final Office Action for U.S. Appl. No. 12/795,492, mailed on Mar. 17, 2011, 51 pages.
Non-Final Office Action for U.S. Appl. No. 12/198,710, mailed on Mar. 24, 2011, 40 pages.
Notice of Allowance for U.S. Appl. No. 12/639,749, mailed on Feb. 11, 2011, 51 pages.
Notice of Allowance for U.S. Appl. No. 12/639,762, mailed on Mar. 4, 2011, 7 pages.
Notice of Allowance for U.S. Appl. No. 12/400,594, mailed on Mar. 23, 2011, 11 pages.
Notice of Allowance for U.S. Appl. No. 12/372,390, mailed on Mar. 9, 2011, 8 pages.
Non-Final Office Action for U.S. Appl. No. 12/070,893, mailed on Mar. 18, 2011, 7 pages.
Non-Final Office Action for U.S. Appl. No. 11/779,714, mailed on Mar. 31, 2010, 26 pages.
Non-Final Office Action for U.S. Appl. No. 10/810,208, mailed on Feb. 5, 2010, 13 pages.
Final Office Action for U.S. Appl. No. 11/668,322, mailed on Feb. 24, 2010, 33 pages.
Non-Final Office Action for U.S. Appl. No. 11/854,486, mailed on Jan. 12, 2010, 23 pages.
Final Office Action for U.S. Appl. No. 10/140,751, mailed on Mar. 25, 2010, 29 pages.
Advisory Action for U.S. Appl. No. 11/745,008, mailed on Apr. 21, 2010, 8 pages.
Notice of Allowance for U.S. Appl. No. 11/621,038, mailed on Apr. 28, 2010, 15 pages.
Non-Final Office Action for U.S. Appl. No. 12/198,697, mailed on Feb. 2, 2010, 50 pages.
Final Office Action for U.S. Appl. No. 10/140,749, mailed on Jan. 13, 2010, 44 pages.
Non-Final Office Action for U.S. Appl. No. 12/400,594, mailed on May 14, 2010, 53 pages.
Non-Final Office Action for U.S. Appl. No. 12/372,390, mailed on Apr. 22, 2010, 46 pages.
Final Office Action for U.S. Appl. No. 11/615,769, mailed on Jan. 22, 2010, 34 pages.
Final Office Action for U.S. Appl. No. 11/646,845, mailed on Jun. 9, 2011, 22 pages.
Notice of Allowance for U.S. Appl. No. 11/953,743, mailed on Apr. 28, 2011, 19 pages.
Final Office Action for U.S. Appl. No. 10/140,751, mailed on Jun. 28, 2011, 23 pages.
Non-Final Office Action for U.S. Appl. No. 12/702,031, mailed on Apr. 29, 2011, 5 pages.
Non-Final Office Action for U.S. Appl. No. 12/198,697, mailed on May 20, 2011, 43 pages.
Final Office Action for U.S. Appl. No. 11/953,742, mailed on Jun. 14, 2010, 21 pages.
Final Office Action for U.S. Appl. No. 11/953,743, mailed on Jul. 15, 2010, 21 pages.
Non-Final Office Action for U.S. Appl. No. 11/953,745, mailed on Jun. 14, 2010, 19 pages.
Final Office Action for U.S. Appl. No. 11/953,751, mailed on Jun. 25, 2010, 24 pages.
Notice of Allowance for U.S. Appl. No. 10/810,208, mailed on Jul. 15, 2010, 15 pages.
Non-Final Office Action for U.S. Appl. No. 11/668,322, mailed on Jun. 22, 2010, 16 pages.
Notice of Allowance for U.S. Appl. No. 11/854,486, mailed on Jul. 13, 2010, 12 pages.
Final Office Action for U.S. Appl. No. 12/198,697, mailed on Aug. 2, 2010, 55 pages.
Non-Final Office Action for U.S. Appl. No. 12/070,893, mailed on Jun. 10, 2010, 44 pages.
Advisory Action for U.S. Appl. No. 11/615,769, mailed on May 25, 2010, 3 pages.
Notice of Allowance for U.S. Appl. No. 11/615,769, mailed on Jul. 12, 2010, 14 pages.
U.S. Appl. No. 12/795,492, filed Jun. 7, 2010, Davis et al.
U.S. Appl. No. 12/702,031, filed Feb. 8, 2010, Davis.
U.S. Appl. No. 12/466,277, filed May 14, 2009, Lin.
Non-Final Office Action for U.S. Appl. No. 12/639,762, mailed on Sep. 1, 2010, 40 pages.
Non-Final Office for U.S. Appl. No. 12/400,645, mailed on Sep. 1, 2010, 45 pages.
Non-Final Office Action for U.S. Appl. No. 12/372,390, mailed on Sep. 13, 2010, 10 pages.
U.S. Appl. No. 12/198,710, filed Aug. 26, 2008, Zhang et al.
U.S. Appl. No. 12/883,073, filed Sep. 15, 2010, Davis.
U.S. Appl. No. 12/900,279, filed Oct. 7, 2010, Bansal et al.
Non-Final Office Action for U.S. Appl. No. 11/646,845, mailed on Oct. 4, 2010, 48 pages.

Final Office Action for U.S. Appl. No. 11/779,714, mailed on Nov. 9, 2010, 24 pages.
Non-Final Office Action for U.S. Appl. No. 12/198,697, mailed on Oct. 25, 2010, 36 pages.
Non-Final Office Action for U.S. Appl. No. 12/198,710, mailed on Sep. 28, 2010, 15 pages.
Requirement for Restriction/Election for U.S. Appl. No. 12/639,749, mailed on Dec. 7, 2010, 3 pages.
Final Office Action for U.S. Appl. No. 12/400,594, mailed on Oct. 28, 2010, 13 pages.
Non-Final Office Action for U.S. Appl. No. 12/505,390, mailed on Oct. 28, 2010, 51 pages.
Final Office Action for U.S. Appl. No. 12/070,893, mailed on Nov. 24, 2010, 11 pages.
Non-Final Office Action for U.S. Appl. No. 11/646,845, mailed on Oct. 14, 2011, 19 pages.
Final Office Action for U.S. Appl. No. 11/953,742, mailed on Oct. 26, 2011, 19 pages.
Notice of Allowance for U.S. Appl. No. 11/953,751, mailed Dec. 7, 2011, 12 pages.
Supplemental Notice of Allowance for U.S. Appl. No. 11/953,751, mailed Dec. 27, 2011, 6 pages.
Notice of Allowance for U.S. Appl. No. 11/779,778, mailed on Jul. 28, 2011, 11 pages.
Non-Final Office Action for U.S. Appl. No. 11/668,322, mailed on Aug. 30, 2011 17 pages.
Non-Final Office Action for U.S. Appl. No. 11/745,008, mailed on Sep. 14, 2011, 26 pages.
Final Office Action for U.S. Appl. No. 12/795,492, mailed on Jul. 20, 2011, 11 pages.
Notice of Allowance for U.S. Appl. No. 12/795,492, mailed on Nov. 14, 2011, 10 pages.
Notice of Allowance for U.S. Appl. No. 12/198,697, mailed Nov. 28, 2011, 12 pages.
Final Office Action for U.S. Appl. No. 12/198,710, mailed on Oct. 19, 2011, 58 pages.
Final Office Action for U.S. Appl. No. 12/070,893, mailed on Sep. 21, 2011, 12 pages.
Requirement for Restriction/Election for U.S. Appl. No. 12/466,277, mailed on Aug. 9, 2011, 6 pages.
Notice of Allowance for U.S. Appl. No. 12/466,277, mailed on Nov. 2, 2011, 47 pages.
Edwards, et al., "Pipeline Method and System for Switching Packets," U.S. Appl. No. 13/398,725, filed Feb. 16, 2012, 54 pages.
Hsu, et al., "Selection of Trunk Ports and Paths Using Rotation," U.S. Appl. No. 13/407,397, filed Feb. 28, 2012, 30 pages.
Notice of Allowance for U.S. Appl. No. 11/668,322, mailed on Feb. 10, 2012, 20 pages.
Notice of Allowance for U.S. Appl. No. 12/198,697, mailed Jan. 5, 2012, 4 pages.

* cited by examiner

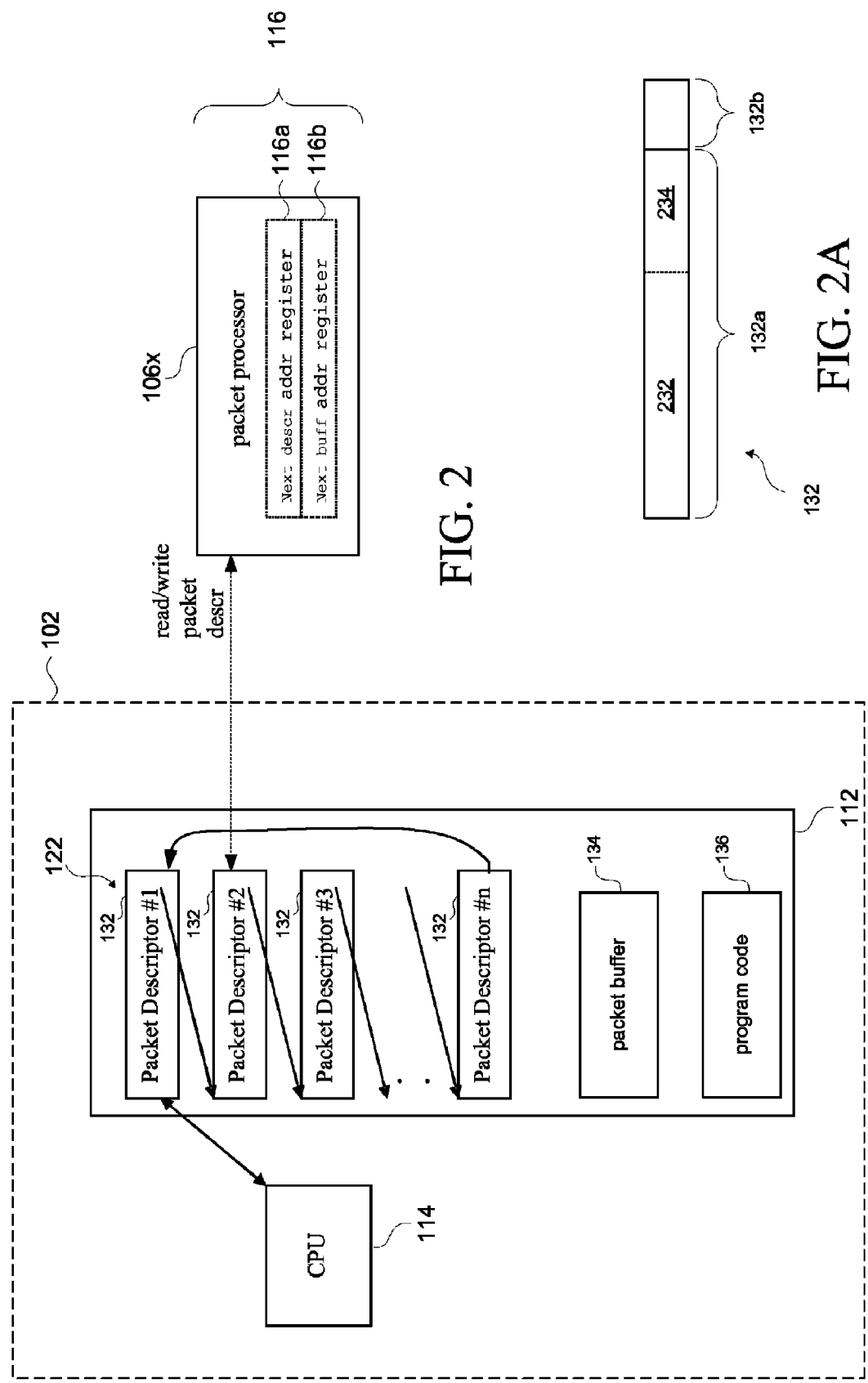

RECOVERING FROM FAILURES WITHOUT IMPACT ON DATA TRAFFIC IN A SHARED BUS ARCHITECTURE

CROSS-REFERENCES TO RELATED APPLICATIONS

This application claims priority from U.S. Provisional Application No. 60/860,882, filed Nov. 22, 2006, and U.S. Provisional Application No. 60/937,270, filed Jun. 25, 2007, which are fully incorporated herein by reference for all purposes.

BACKGROUND OF THE INVENTION

The present invention relates generally to communications error recovery, and in particular to recovery from communication errors in networking equipment having a shared control bus architecture.

Network switching equipment typically comprises a set of physical ports, one or more packet processors that receive data packets from and send packets to a physical port (or to a plurality of physical ports) of the network switching device via PHY and MAC circuitry, and a controller (typically CPU-based). The packet processors may be ASICs or FPGAs. The physical ports and packet processors (each of which has its own input and output ports) may be arrayed over a plurality of linecards, as in a chassis type unit, or on a single circuit board, as in a stackable unit. A received data packet can be processed and forwarded by a packet processor to another physical port coupled to an output port of the same packet processor. Alternatively, the received data packet can be forwarded by a receiving packet processor through a switching fabric to another packet processor to be further processed and forwarded via one of its output ports to a physical port of the switching device During normal operation, there is occasional data communication between the respective packet processors and the CPU-based controller. The CPU-based controller may be on a separate management circuit board, such as in a typical chassis type network switching device, or on the same circuit board, as in a typical stackable type network switching device. In some network switching devices, there may be a dedicated controller for each packet processor or for a plural subset of the packet processors of the switching device In a cost optimized system, on the other hand, there may be one CPU-based controller for the whole system, e.g., for the entire set of packet processors of the network switching device. This centralized architecture is advantageous from a system-cost point of view, since there is only one CPU-based controller for all of the packet processors, but it poses some challenges, since there is a shared control bus coupling the CPU-based controller to the packet processors. The complex intercoupling of data structures between the controller and the packet processor that form the basis of controller-packet processor communication is susceptible to malfunctions that can render the system unusable.

BRIEF SUMMARY OF THE INVENTION

In a data switching system, error recovery from data communication errors according to the present invention includes detecting occurrence of an error condition arising in a network switching device during data communication between a packet processor(s) and a controller in a shared bus architecture. In one embodiment, the controller, which is running a software program, detects the error. In response to detecting the error, data communication on the shared bus between the affected packet processor(s) and the controller is ceased pending a recovery step. Recovery of the data structures of the packet processor using data structures stored in the controller is performed, and communication between the affected packet processor(s) and the controller is resumed. Meanwhile, packet processing and forwarding by packet processor(s) (if any) is unaffected by the error continues, even to the extent such packet processing and forwarding requires communication with the controller. Further, packet processing and forwarding of packets by the packet processor(s) affected by the communication error also continues during the period of error detection and recovery, to the extent such processing and forwarding does not require communication between the affected packet processor(s) and the CPU controller, as would be the case, for instance, where the CPU controller had already programmed the memory(ies) accessed by the affected packet processor(s) with forwarding information necessary to process and forward particular received packets. This exemplary aspect allows for greater reliability of the network switch, because in prior shared bus systems, no packet forwarding was performed by the affected packet processor(s), or perhaps by the entire network switch, during the period of error detection and recovery, i.e., received packets were not forwarded, regardless of whether the memory(ies) had previously be programmed with forwarding information.

BRIEF DESCRIPTION OF THE DRAWINGS

FIG. 2 is an illustration of the data structures used between the host CPU and each of the packet processors.

FIG. 2A is a illustration of a packet descriptor.

DETAILED DESCRIPTION OF THE ILLUSTRATIVE EMBODIMENTS

Figure 1:
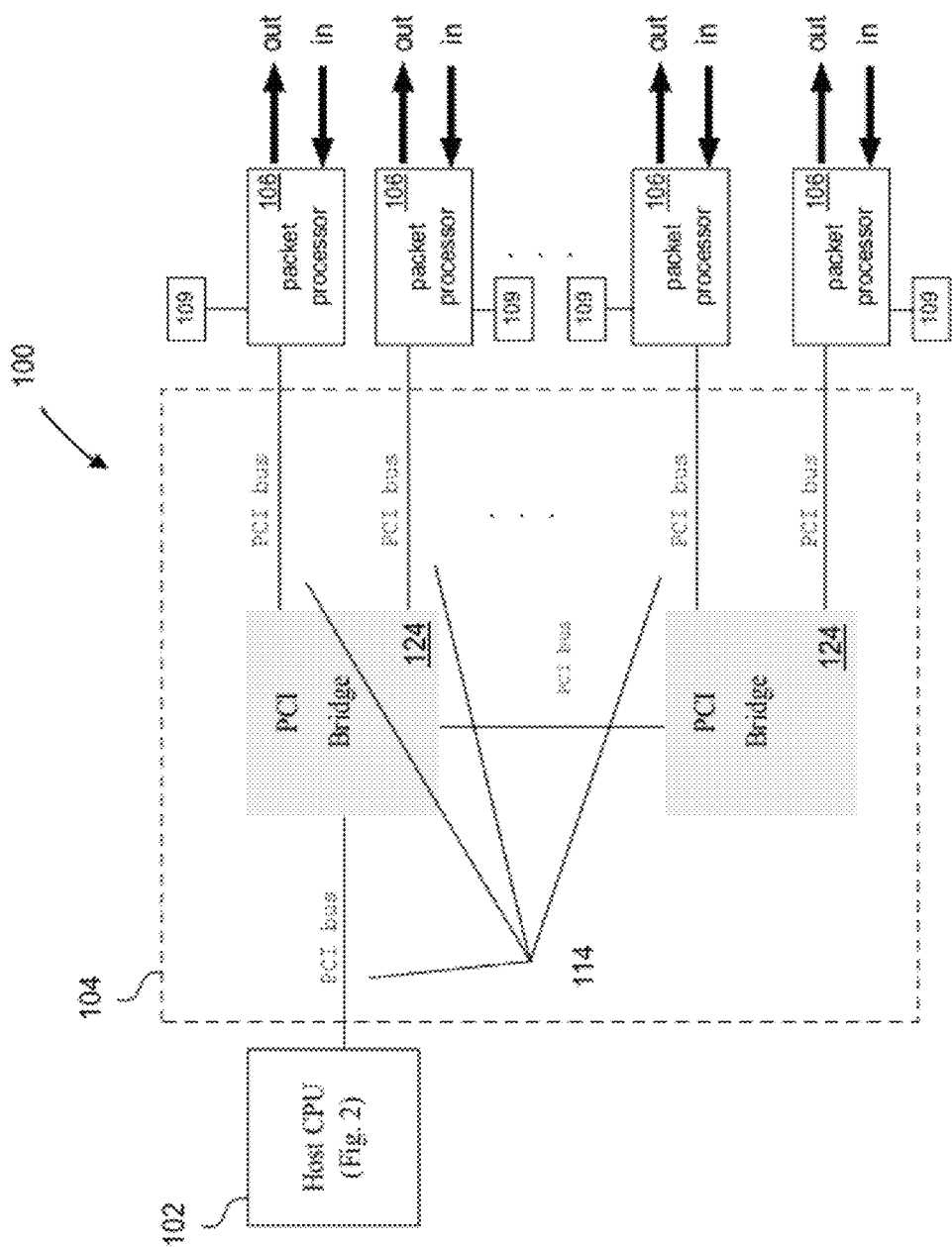
FIG. 1 is a generalized schematic diagram of an illustrative example of a shared bus architecture for packet processors and host CPU embodied according to the present invention.

FIG. 1 shows at high level a network switching device 100 (e.g., L2/L3 switch, wireless network switch, L4-7 switch, and the like) embodied according to the present invention. The switching device 100 can comprise one or more system management controllers, although the embodiment shown in FIG. 1 shows only one system management controller (CPU 102 or host CPU 102). CPU 102 controls switching device 100, including the one or more packet processors of switching device 100. Typically, the CPU 102 comprises a general data processor, which executes software stored in a memory of switching device 100.

Figure 1A:
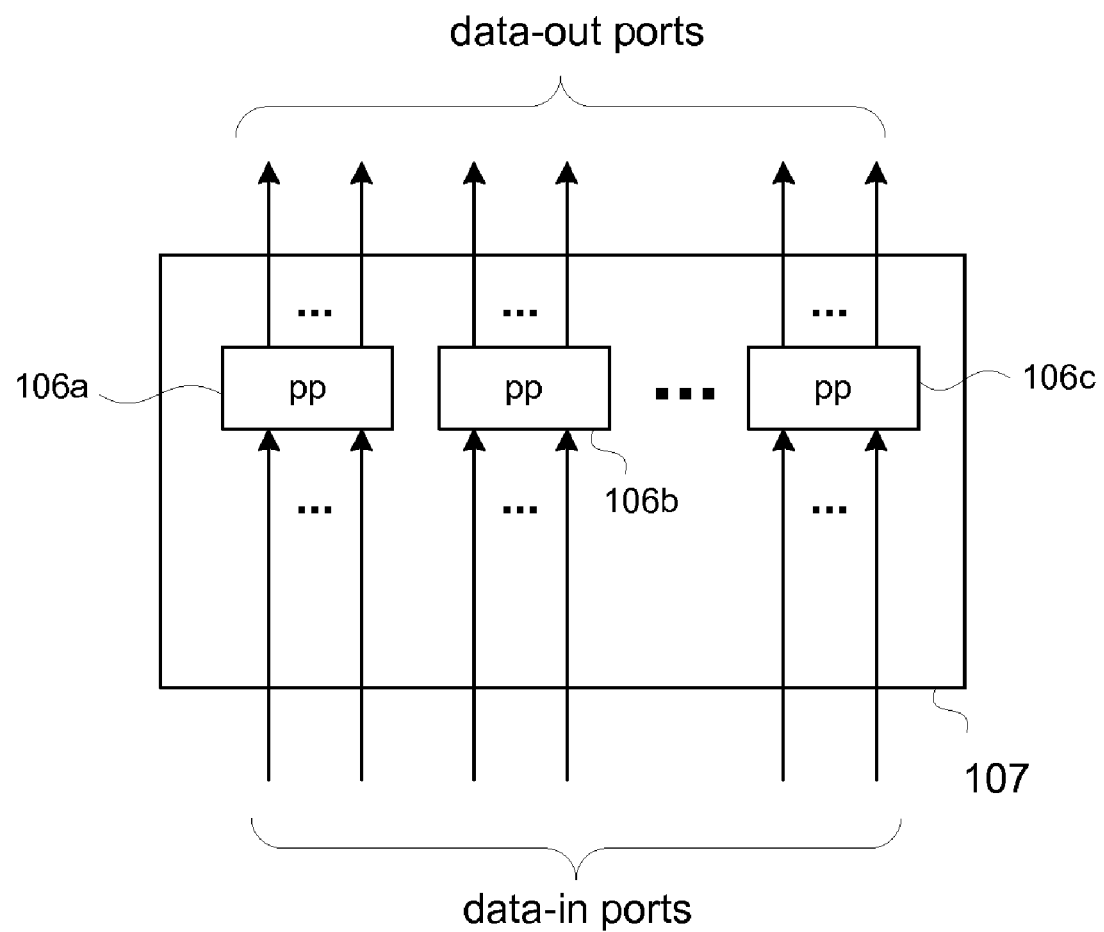
FIG. 1A is a generalized schematic diagram of a line card including packet processors.

Switching device 100 of FIG. 1 includes a plurality of packet processors 106, which may be arrayed on a single circuit board, or amongst a plurality of circuit boards. Sometimes such circuit boards are called linecards. For example, referring to FIG. 1A, three such packet processors 106a-106c are shown on a single line card 107 in an uppermost portion of FIG. 1A, but the number of packet processors may be more or less than three. The logic that constitutes a packet processor 106 is typically embodied in an ASIC (application-specific integrated circuit) or an FPGA (field-programmable gate array). An example packet processor may be one of the Prestera family of packet processors from Marvell Semiconductor Inc. Such custom circuits are built for high speed performance and may have various functionality and speeds, such as 10/100, 1G, or 10G Ethernet capability. Each packet processor 106a-106c has one or more input ports (represented by a heavy arrow) and one or more output ports (represented by a heavy arrow). The host CPU 102 and the packet processors 106 are generally connected via a connector module 104 that includes a shared bus architecture to facilitate communication between the host CPU 102 and the packet processors 106a-106c.

One of the functions provided by the host CPU 102 is to program a memory 109 (e.g., a CAM and/or RAM, internal to the packet processor or external) with learned or user-inputted forwarding data so that, upon access of the memory by the packet processor 106 in response to a packet received via an in port of the switching device 100, the packet processor 106 will be able process the packet using the forwarding data to forward the received packet, typically at line rate, without the need for assistance from or communications with, the CPU 102. This type of pre-programmed forwarding by the packet processor 106 is sometimes called hardware forwarding. After processing in the packet processor 106, a received packet may be transmitted through the out port of the packet processor 106 to an out put port of the switching device 100, or to the in port of another of the packet processors 106, for further processing before the packet ultimately is sent to an output port of the switching device 100 (or dropped) Absent such pre-programmed forwarding data, a packet processor 106 may communicate with the host CPU 102 over the shared control bus, for assistance in forwarding the received packet. The CPU 102 may process the packet, and forward the packet to the same or another packet processor 106 for further processing and forwarding, e.g., VLAN flooding, or drop the packet, in accordance with the CPU's instruction set. Such communications (and other communications between the packet processors 106 and the host CPU 102) occur via the connection module 104 of FIG. 1. In this case, connection module 104 has a shared bus architecture and provides a communication channel coupling all of the packet processors 106a-c to CPU 102. In this example, the shared bus architecture is a PCI architecture, and includes a plurality of buses 114 and two bridges 124 that are each coupled to a pair of the packet processors 106. Typically, the PCI architecture is composed of a set of interconnected integrated circuits. It should be apparent that other shared bus architectures besides a PCI architecture can be adapted in accordance with the present invention. Further, practitioners will appreciate that there could be a variety of circuits, e.g., traffic manager circuits, and a switching fabric in switching device 100 to facilitate packet forwarding by and among the packet processors 106 and the CPU 102.

The present invention involves, among other things, detecting and resolving an error arising in the shared communication channel between the host CPU 102 and packet processor(s) 106. The error may affect the communications between the CPU 102 and all, or less than all (one or more), of the packet processors 106a-c. Such an error may be due to an unintended mechanical or electrical disturbance, e.g., a power spike, or the like, or may be due to an intended action, such as a hotswap action. In a hotswap, a circuit board (e.g., a line card including some packet processors 106, or a management card including CPU 102 (and perhaps some packet processors 106 as well), is hot removed from the switching device 100, and hot replaced with a like circuit board without a powering down of the switching device 100. Hotswap capability can improve the up time of the switching device 100.

I. Communication Over the Control Plane

In an architecture such as depicted in FIG. 1, data communications between the host CPU 102 and packet processors 106a-106c comprise transferring data over the PCI bus. A data structure is used to manage the communication between the host CPU 102 and the packet processors 106. The reference to "control plane" refers to the data communication channel between the host CPU 102 and a respective packet processor 106a-106c.

FIGS. 2 and 2A show an example of such a data structure. The example data structure, a packet descriptor ring 122, comprises packet descriptors 132 organized into a structure commonly referred to as a circular linked list. Each packet descriptor 132 comprises descriptive information portion 132a (FIG. 2A) and a link portion 132b. The link portion 132b contains an address of the next packet descriptor 132 in the packet descriptor ring 122. The link portion of the last packet descriptor 132 (identified in FIG. 2 by "#n") contains an address of the first packet descriptor 132 (identified in FIG. 2 by "#1"). One such packet descriptor ring 122 is associated with each packet processor 106x. In the particular implementation described herein, the packet descriptor ring 122 is provided in local memory 112 of the host CPU 102 (the figure also shows a processing unit 114 of the host CPU, for example, a conventional data processing unit or a microcontroller). It will be understood that a suitable program code 136 can be provided in local memory 112 to operate the CPU 114.

The descriptive information portion 132a of a packet descriptor 132 comprises data defined by the PCI standard and vendor-specific data. For example in one implementation, the packet descriptor 132 is a sixteen-byte data structure which includes a buffer address 232 (FIG. 2A) portion that stores an address (pointer) to a location in an area of the memory 112 called the packet buffer 134. There is an area in packet buffer 134 that is pointed to by each packet descriptor 132 to store data associated with that packet descriptor 132. The buffer address 232 stores the beginning address of the portion of the packet buffer 134 associated with the packet descriptor. The descriptive information portion 132a may include an additional data field 234. The data contained in the descriptive information portion 132a can vary from one kind of shared bus architecture (e.g. PCI bus) to another. In fact, the data contained in the descriptive information portion 132a may vary even among different implementations of the shared bus or vendors of the shared bus (e.g., PCI bus). For example, a vendor of the chip set that implements a PCI bus architecture may include vendor-specific information in addition to the information required by the PCI standard. The descriptive information portion 132a of each packet descriptor is intended to contain that additional data.

FIG. 2 shows that each packet processor 106x (e.g., the packet processors 106a-c of FIG. 1) includes, among other circuits, a pair of registers: a next descriptor register 116a and a next buffer register 116b, collectively referred to as the packet processor registers 116. As indicated in FIG. 2, each packet processor 106x can access at least a portion of the local memory 112 of the host CPU 102. For example, in the disclosed illustrative embodiment, each packet processor 106x uses a direct memory access (DMA) technique to access its respective packet descriptor ring 122 in the local memory 112, and to access the packet buffers 134 pointed by the constituent packet descriptors 132 of the data structure.

Upon start up of switching device 100, the processing unit 114 of the host CPU 102 configures its memory 112 with packet descriptors 132 and a packet buffer 134. The packet buffer 134 can be initialized with zeroes or some other suitable initial value. Likewise, the additional data portion 234 of each packet descriptor 132 can be filled with a suitable initial value (e.g., zero). This initialization process can be accomplished in software (e.g., in program code 136), or by simply loading a portion of the memory 112 with an image of a predefined configuration of packet descriptors and a packet buffer.

Initializing the packet descriptors 132 includes, for each packet descriptor, at least storing in the buffer address 232 an address of the beginning of a portion of storage in the packet buffer 134. The packet descriptors 132 are linked to create a packet descriptor ring 122 for each packet processor 106*x*. This includes linking a group of the packet descriptors 132 to each other in a linked list. For example, the first N packet descriptors 132 can be linked in a ring structure to define a packet descriptor ring 122 for a first packet processor 106*x*. The next N packet descriptors 132 can be linked in another ring structure to define the next packet descriptor ring 122 for the second packet processor 106*x*, and so on. In this way, an initialized packet descriptor ring 122 for each packet processor 106*x* is created and initialized.

At system startup, the processing unit 114 also initializes the packet processor registers 116 of each packet processor 106*x*. This includes loading the next descriptor address register 116*a* with the address of the first packet descriptor 132 in the packet descriptor ring 122 corresponding to the packet processor 106*x*. The next buffer address register 116*b* is loaded with the buffer address contained in the first packet descriptor. As will be explained below, the packet processor 106*x* uses this address information to transfer data into its corresponding packet descriptor through a DMA operation.

Upon successful completion of the transfer of the control data, status fields in the packet descriptors 132 that were used for that transfer (note that more than one packet descriptor 132 may be consumed) are updated to indicate this fact. A protocol, described below, between the host CPU 102 and the packet processors 106 synchronizes the usage of the packet descriptors 132 (and packet buffers) between them.

An example of a synchronization mechanism between the host CPU 102 and the packet processors 106*x* will now be described. Each packet descriptor 132 contains an ownership bit field that is used for this purpose. The initiator—which could be either the host CPU 102 or packet processor 106*x*—only uses the packet descriptor 132 which is owned by that packet processor.

Consider a data transfer from a packet processor 106*x* to the host CPU 102. The packet processor 106*x* uses the packet descriptor 132 that is currently owned by it, identified by the address contained in the next descriptor address register 116*a*. The packet processor 106*x* transfers control data to the packet buffer 134 in the CPU memory 112 through a DMA operation, identified by the address contained in the next buffer address register 116*b*. After the packet processor 106*x* completes the data transfer into CPU memory, the ownership bit field in the packet descriptor 132 is changed to indicate that the packet processor relinquishes the ownership of that descriptor and now it is owned by the host CPU 102. The host CPU 102, when it sees that it now owns the packet descriptor 132, becomes aware of the availability of control data in the packet buffer and processes the received control data. When the processing is finished, the host CPU 102 changes the ownership bit of the packet descriptor 132 back to that of the packet processor 106*x*. This indicates that the descriptor is now available for the packet processor 106*x* for further data transfer. The same is applicable when host CPU 102 initiates a data transfer to the packet processor 106*x*.

I. Control Plane Failure

A communication error in a shared bus architecture communication channel between a packet processor 106 and the host CPU 102 may occur, for example, during a read or write operation to the packet descriptor ring 122 that is shared between the host CPU 102 and the affected packet processor(s) 106. Such an error could have effects such as: (a) the packet processor receives an invalid packet descriptor address or an invalid buffer address; or (b) the packet descriptor ring 122 in CPU memory 112 becomes corrupted. In both of the above scenarios, the communication between the host CPU 102 and the affected packet processor 106—which may be any subset or all of packet processors 106 of FIG. 1—over the control plane 104 will be broken down, leading (in prior art systems) to an inoperative system. Such may require the prior art switching device to be reset, resulting in no packet forwarding during the reset period of time, an undesirable situation.

The sections which follow disclose exemplary structures and methods to detect exemplary errors, and an exemplary recovery procedure to re-establish control plane communication between the host CPU 102 and the affected ones of packet processors 106. Such structures and methods allow the switching device 100 to continue switching packets through the network during the detection and recovery processes. For instance, packet processor(s) 106 unaffected by the communications error may continue processing forwarding all packet traffic and communicating with the host CPU 102 as necessary over the shared communication channel, while affected packet processor(s) 106 may continue forwarding any packet traffic that does not require communications with CPU 102 (e.g., where forwarding data for the particular received packets already is programmed in the memory 109 accessed by the packet processor 106 during packet processing and forwarding.) This technique maximizes the up time and throughput of the network switching device 100 in the case of such an error.

For the sake of example, we will discuss two error situations that could occur in a shared-bus network switching device 100 operating in a network to which it is coupled when a communication failure occurs in the control plane (e.g., due to hot-swapping or some electrical glitch), namely (1) loss of address/data integrity over the PCI bus, resulting in a parity error; and (2) PCI timeout or failure, yielding incorrect data to the master. Following is an explanation on how the above two exemplary scenarios are detected by the host CPU 102 in accordance with its program code, in accordance with an illustrative embodiment of the present invention.

(1) Loss of Address/Data Integrity Over the PCI Bus, Resulting in Parity Error

Figure 3:
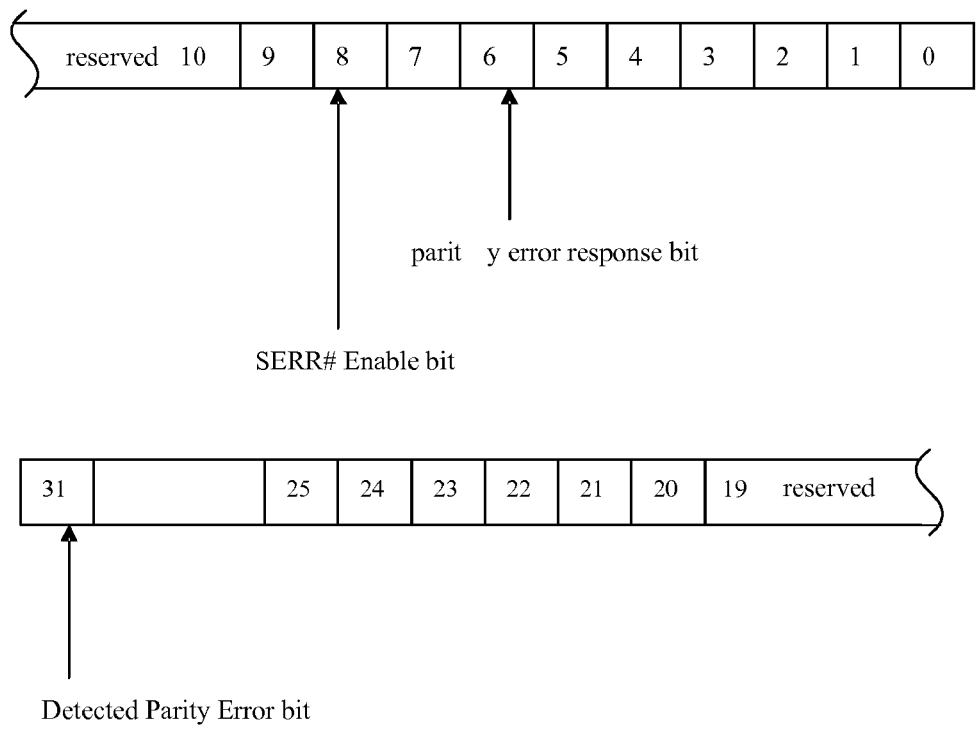
FIG. 3 shows the bits in a PCI-defined status register relevant to a communication error.

An electrical disturbance or other anomalous condition involving the PCI bus can cause the data that is present on the bus at that time to become corrupted, causing the loss of integrity. The PCI standard specifies mechanisms to detect this type of error condition using, e.g., parity information generated during both the address and data phases of a transaction. A detailed description of the parity generation mechanism on the PCI bus can be found in the PCI standard specification. What is relevant for the discussion here is that, when a parity error is detected for the data on the PCI bus, the devices involved in the erroneous transaction (host CPU 102, packet processor(s) 106) set some error bits in the PCI command/status register. This mechanism is defined per the PCI standard as well. Thus, any PCI device will have this mechanism implemented. For clarity of further discussion, some bit-fields of the 32 bit PCI configuration command/status register (offset 0x4) relevant to error detection are shown in FIG. 3.

(2) PCI Timeout or Failure

A timeout or other failure during a PCI transaction may occur, for instance, due to hotswapping a linecard while a packet processor(s) 106 of the linecard is communicating with the host CPU 102. For instance, such an electrical disturbance occurring during communication between a packet processor 106 and the host CPU 102 can result in a failure yielding incorrect data to the device (packet processor 106 or the host CPU 102) that originated the operation. In the context of a switching system 100, this could result in the affected packet processor(s) 106 getting an invalid packet descriptor address or an invalid packet buffer address if the affected packet processor(s) was in the middle of a read operation during the hotswap operation. An invalid address obtained like this will cause the packet processor 106 to be unable to properly transfer data to the CPU. For example, an invalid packet descriptor address may cause the packet processor 106 to access an incorrect packet descriptor 132 within its associated packet descriptor ring 122, or worse yet may cause the packet processor 106 to access a packet descriptor 132 belonging to another packet processor. Similarly, an incorrect packet buffer address will cause the wrong area in the packet buffer 134 to be accessed, resulting in writing of data to an area in the packet buffer that belongs to another packet processor 106.

III. Control Plane Failure Detection by the Host CPU

Figure 5:
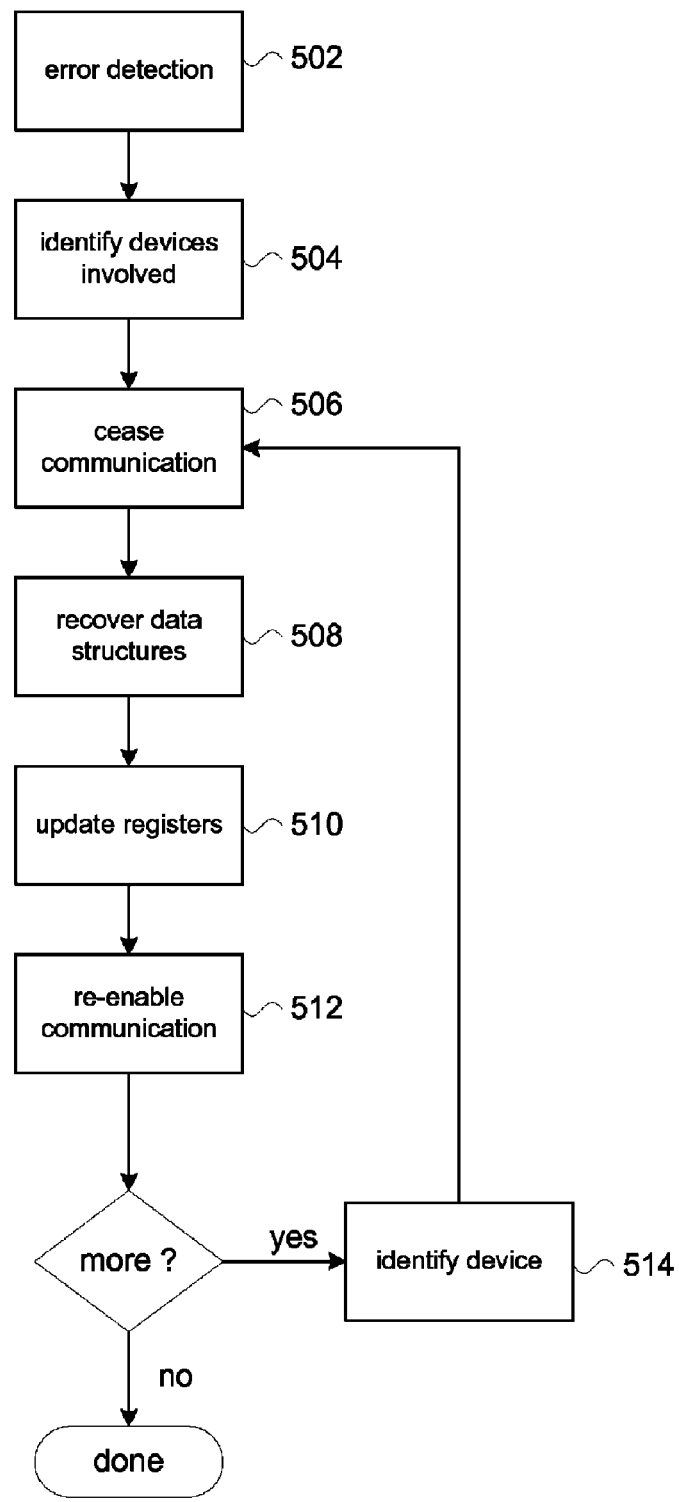
FIG. 5 illustrates the flow for error recovery according to the present invention.

FIG. 5 illustrates a detection and recovery process within the present invention, and for this example is explained in terms of the disclosed illustrative PCI architecture embodiment. The processing is performed in the host CPU 102 by way of program code that is executed by the processing unit 143. Typically, the program code is stored in the CPU memory 112, but can be stored in a ROM (read-only memory) or a flash device, and so on. It will be apparent from the discussion that follows that the present invention can be practiced, for instance, using any shared bus architecture.

Referring to FIG. 5, the process begins with detection of a communication error between the host CPU 102 and a packet processor 106, step 502. In an embodiment of the present invention, the underlying bus architecture for communication between the host CPU 102 and the packet processors 106 is the PCI shared bus.

Figure 4:
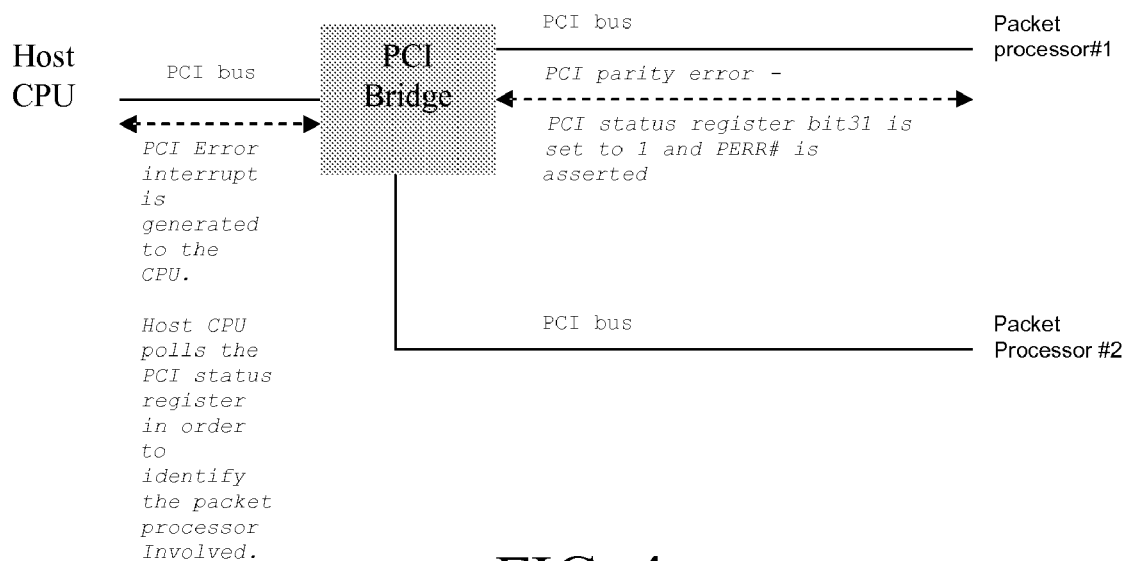
FIG. 4 illustrates the detection sequence for a communication error on the PCI bus.

Referring to FIG. 4, a data phase parity error will be described as an example of a communication error. This type of error can arise during a PCI write (or read) transaction. FIG. 4 shows segments of connector module 104 (FIG. 1) involved in the transaction, which include the CPU-to-PCI bridge segment and PCI bridge-to-packet processor segment. If an error occurs during a transaction, which could be in either direction, the PCI error status is propagated to both ends. The host CPU 102, the PCI bridge 124, and the packet processor 106a all receive the PCI error status. Thus, the host CPU 102 detects the PCI error for both communication scenarios: (1) where the host CPU 102 sends data to packet processor 106 and (2) where the packet processor 106 sends data to the host CPU 102.

Upon detection of a data phase parity error, the PCI device (i.e., host CPU 102 or packet processor 106) that checked the parity is responsible for asserting the Detected Parity Error bit (bit31) (FIG. 3) in its PCI configuration status register. It also asserts the PERR# signal if the Parity Error Response bit in its PCI Configuration command register (bit6) is set to one. A parity error on the address phase of a transaction causes the PCI device to set the SERR# signal, if the SERR# enable bit is set to one in the PCI configuration command register. In this example, the packet processors 106a-106c and the host CPU 102 are the PCI devices.

The PERR# signal or the SERR# signal, when asserted, could generate an interrupt to the host CPU 102. In order to get these signals, the host CPU 102 interrupts must be enabled. This is done in the software which configures the host CPU's PIC (Programmable Interrupt Control) registers appropriately during the hardware initialization (startup) phase.

Upon detection of the occurrence of an error, an attempt is initiated to identify the devices that are involved with the error, step 504. In the disclosed example embodiment, packet processors 106a-106c communicate with the host CPU 102 over the PCI shared bus. Thus, the host CPU 102 will always be one of the devices involved in a detected communication error. The following description of step 504, in this particular embodiment, then amounts to a discussion about identifying the packet processor(s) 106a-106c that experienced the communication error.

A communication error can manifest itself in the PCI shared bus by raising an interrupt signal, as described above. When the host CPU 102 is interrupted by the interrupt signal due to a PCI error detection, a corresponding interrupt service routine is executed. The interrupt running in the host CPU polls each of the packet processors 106a-106c (which may be on one or more linecards) residing on the PCI bus on which the interrupt originated. In an embodiment, the host CPU 102 reads the PCI configuration status register (FIG. 3) of each packet processor 106 and inspects the "Detected Parity Error" bit (bit 31). A packet processor 106 that detected the PCI parity error will have its "Detected Parity Error" bit set to one. The host CPU 102 in this way identifies the packet processor 106 that experienced the communication error. As mentioned, there may be a situation where more than one packet processor experiences a communication error with the host CPU. Thus, in an embodiment of the present invention, the host CPU 102 polls each and every one of the plural packet processors 106 to identify all packet processor(s) 106 experiencing a communication error.

The discussion above deals with detecting a communication error between a packet processor 106 and the host CPU where the packet processor 106 is sending data to the host CPU 102. However, the error handling herein is applicable for data transfer in either direction between host CPU 102 and the packet processor. When host CPU 102 detects a PCI error that results when data is transferred over the shared control plane from the packet processor 106 to the host CPU 102 or vice-versa, the recovery procedure is invoked to rectify the error. As will be explained below, the present invention allows for error recovery while at the same time leaving unaffected pre-programmed hardware forwarding of received packets by the affected (and unaffected) packet processor(s) 106 to continue. Further, packet processors 106 not affected by the error may continue control plane communications with CPU 102 as necessary to process and forward received packets.

As another example of steps 502 and 504, a PCI timeout or failure may be detected as follows. The read and write operation from host CPU 102 to the packet processor 106 is implemented using known DMA (direct memory access) techniques. Underneath the DMA, it is a PCI transaction as the host CPU 102 and packet processor 106 are connected through a PCI interface. The actions involved in such an operation from the CPU-side are:

1. CPU configures the DMA registers;
2. CPU initiates a timer;
3. CPU initiates the DMA operation;
4. CPU checks the DMA status for error/success/busy;
5. CPU repeats the above "check" step until the returned status is success, or error, or until the timer expires.

In the case of successful operations, the host CPU 102 detects the DMA completion by the channel being not busy and the DMA status does not indicate an error. In the case of a PCI failure, the host CPU 102 detects the DMA engine returning the error back. In the case of a PCI timeout, the DMA channel never returns and the host CPU 102 initiated timer expires, thus indicating the PCI timeout discussed above.

In a case for example of a failure or timeout during a PCI read transaction (where the packet processor 106 attempts to read data from the host CPU), the operation typically returns with 0xFFFFFFFF to the packet processor. The host CPU 102 can detect this error condition by reading the relevant hardware register in the packet processor. The relevant register can vary, depending on the shared bus architecture used to connect the packet processor and CPU. If they are connected through PCI, this register would be, e.g., the PCI status register. In a more generic context, the packet processor vendor could implement a specific register to reflect the status of a transaction it made to read from CPU memory.

Continuing, the host CPU 102 polls the relevant register of each packet processor 106 present in the switching device 100 in order to identify the one or more packet processors 106 that encountered a communication error over the shared communication bus. If the error condition is detected, then the host CPU 102 invokes the recovery method discussed below for each of the one or more affected packet processors 106 in order to recover. In one embodiment, this process of polling the relevant registers of the packet processors can be selectively performed. For instance, it may be programmed to occur only when a hotswap is detected (e.g., loss of heartbeat signal or loss of power signal or some other signaling method). Alternatively, the polling can be performed periodically.

Again, the figures and discussion herein, while sometimes directed to a read operation, for example, are applicable in the other direction as well, because the PCI status gets propagated to both ends—the CPU 102, the PCI bridge, and the packet processor 106 all get that information. Thus, the CPU 102 detects the PCI error for both communication scenarios, where the CPU 102 sends data to the packet processor 106, and where the packet processor 106 sends data to the CPU 102.

Note that, while the above examples have the CPU 102 detect the control plane communication error by the generation of an interrupt to the CPU 102, or by periodic or event-driven (e.g., hotswap) polling of registers, other methods of detecting the error condition, and identifying the affected packet processor(s) 106 may be utilized. This may vary, for instance, by the type of shared bus architecture used in the network switching device 100. As mentioned, the example of a PCI bus is exemplary only.

Continuing with FIG. 5, the discussion will now be directed to recovery steps performed in response to detecting the error. As discussed above, the consequences of communication errors in the control plane 104 resulting from a PCI failure during a read/write transaction involving by a packet processor 106 may include:

1. the affected packet processor gets an invalid packet descriptor address or invalid packet buffer address
2. a packet descriptor ring (whether the one associated with the packet processor, or one associated with another packet processor) in CPU memory gets corrupted
3. the packet buffer(s) get corrupted When a communication error is detected and the packet processor(s) 106 that faced the error is identified by the CPU 102 via step 504, the host CPU 102 then performs the following actions according to its program code to recover from it:

step 506—Communication between the identified packet processor 106 and the host CPU 102 is disabled. In an embodiment, a specific hardware configuration register in the packet processor is modified for this purpose The modification could be, for example, to set or reset a certain bit or bits in the packet processor register which would correspond to enabling or disabling the transfer of packets to or from the CPU memory. This would be a register which is dependent on the specific manufacturer of the packet processor. It is noted that data communication between the host CPU 102 and other functional unaffected packet processors 106 will not be ceased, and will continue. It is further noted that packet forwarding taking place among the packet processors 106 likewise continues to the extent it is pre-programmed or involves unaffected portions of the control plane. Thus, although communication between the host CPU and the identified affected packet processor(s) 106 is halted per this step, data communication continues in those parts of the switching device 100 that have not experienced a communication error.

step 508—The data structures in the CPU memory 112 allocated to the identified affected packet processor 106 are recovered and reinitialized. Thus, in an embodiment of the present invention, only the packet descriptor ring 122 associated with the identified packet processor 106 is recreated by resetting the link portions 132b of its constituent packet descriptors 132 as described during the startup process. The additional data portions 132a, are likewise reset. The portions of the packet buffer 134 associated with the packet descriptors 132 are reset; e.g., zero-filled. The buffer address 232 of each packet descriptor is reset to the starting address of its corresponding portion of the packet buffer 134. The data structures used for packet communication that were allocated for the identified affected packet processor 106 are thus recovered, although any data that was in transit between the host CPU 102 and the affected packet processor 106 will be lost. Consequently, repeated communication failures experienced by a packet processor 106 will not result in the accumulation of lost resources (e.g., memory allocated to data structures). This aspect of the present invention prevents the possibility of running out of resources (e.g., allocated memory) if a packet processor 106 experiences repeated communication failures.

step 510—The hardware registers in the identified packet processor 106 are updated by the CPU 102 with the address of the first packet descriptor in a re-initialized packet descriptor ring and its buffer address to be used in a next packet transfer.

Step 512—The data transfer between the now-restored packet processor 106 and the host CPU 102 is re-enabled.

Thus, in accordance with the present invention, a communication error in a switching device 100 that occurs between a packet processor (s) 106 and the host CPU 102 can be recovered without having to power down the entire switching device 100. This is advantageous because packet switching can continue during the detection and recovery process.

Affected packet processor(s) 106 can process and forward packet traffic to the extent necessary forwarding data already is programmed in the memory accessed by the packet processor (or other information or programming of the packet processor allows it to process the packet without data communication with the CPU 102). This maximizes the up time of the switching device 100 during such an error condition.

In the case where more than one packet processor 106 experiences a communication failure with the host CPU 102, the host CPU 102 can identify (more? of FIG. 5) in step 514 each additional failed packet processor 106 and repeat the foregoing recovery steps 506-512. It is noted that the host CPU 102 can detect communication error in packet processors 106 residing among different linecards 107 in a chassis type system. Thus, for example, in step 504 the host CPU 102 might identify an affected packet processor 106 on a first linecard 107 and, in step 514 might identify an affected packet processor 106 on a second linecard. The recovery step 506-512 can be performed for the failed packet processor 106 on the first linecard, and then repeated for the failed packet processor 106 on the second linecard.

In an alternative embodiment, step 514 may be performed after step 506, and then after all affected packet processors 106 are identified, then steps 508-512 may be performed for each of the affected packet processors 106.

The switching device of the present invention recovers from certain communication errors by reestablishing the communication between the host CPU and the affected packet processor in manner that maintains normal packet switching functionality to the greatest possible extent. Since the procedure disrupts only the data transfer between the host CPU 102 and the affected packet processor 106, the data transfer that occurs between host CPU 102 and the other unaffected packet processor(s) 106 and the data transfer that is switched by the packet processors 106 themselves without CPU intervention is not impacted.

Figure 6:
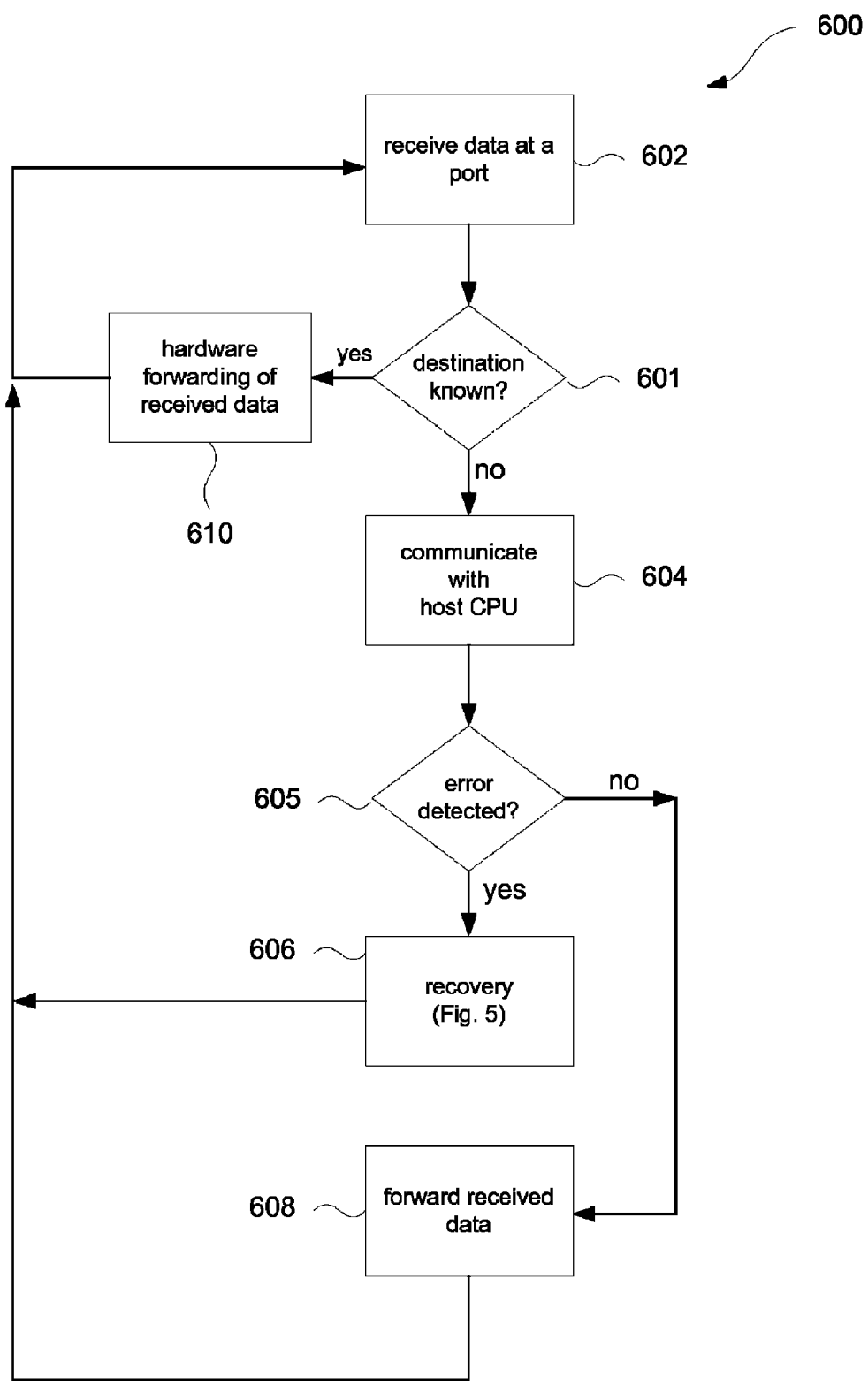
FIG. 6 illustrates the flow for error recovery while pre-programmed, a.k.a., hardware, forwarding continues.

FIG. 6. illustrates a process 600 performed in a network switch 100 in accordance with the present invention. Thus, in a step 602, a packet processor 106 receives data at one of its ports from a physical port of a network switch (via a PHY and MAC interface, for example). In the course of processing the packet, a determination is made (step 603) by the receiving packet processor 106 as to whether the packet processor 106 can hardware forward the received packet based on, e.g., pre-programmed forwarding data in the memory 109 accessed by the packet processor. If yes, then the packet processor 106 will forward the received data packet accordingly, in a step 610; i.e., the host CPU 102 is not involved. The flow of steps 602 and 610, since there is no interaction over the shared communication bus with the host CPU 102, can occur at wire speed because the received data packet is hardware forwarded. By contrast, if the destination is not known, then the packet processor 106 will communicate in step 604 with the host CPU 102 over the control plane in order that, e.g., the host CPU 102 might learn from, drop, or assist in the forwarding of, the received packet. In step 608, in the no error condition, the packet is processed by the CPU 102, and further processed and forwarded by the same or a different packet processor 106 accordance with the processing by the CPU. If, during or after this control plane communication, an error is detected by the host CPU 102 in a step 605, then the flow proceeds via step 606 to the processing shown in FIG. 5. During the detection and recovery process, steps 602 and 610 may continue to be performed by the packet processor(s) that are undergoing error recovery via step 606. Other packet processors 106 unaffected by the control plane communications error may continue with steps 601 and 610 using pre-programmed forwarding data, or with steps 604 and 608 where data communication with the host CPU 102 over the shared control plane is necessary to process and forward a particular packet.

The above embodiments are exemplary only, and may be modified without departing from the invention in is broader aspects.

What is claimed is:

1. A method for error recovery in a network device, the method comprising:
storing, in a memory associated with a host processor of the network device, a set of data structures used for facilitating communication between the host processor and a plurality of packet processors of the network device;
forwarding, by a first packet processor from the plurality of packet processors, one or more packets received by the network device using forwarding information programmed by the host processor into a memory accessed by the first packet processor;
detecting, by the host processor, an error condition indicative of a communication error between the host processor and a packet processor from the plurality of packet processors;
in response to detection of the error condition:
identifying, by the host processor, from the plurality of packet processors, the first packet processor affected by the error condition; and
performing, by the host processor, a set of recovery actions for recovering from the error condition, the performing comprising
disabling communication between the host processor and the first packet processor, and
restoring, by the host processor, to an initial state a data structure from the set of data structures used for communication between the host processor and the first packet processor; and
while the set of actions is being performed, forwarding, by the first packet processor, at least one packet received by the network device using the forwarding information programmed into the memory accessed by the first packet processor prior to detecting the error condition.

2. The method of claim 1 further comprising
while the set of actions is being performed, communicating data between the host processor and at least one packet processor from the plurality of packet processors other than the first packet processor.

3. The method of claim 1 further comprising resetting a portion of the memory associated with the host processor with initialization data.

4. The method of claim 1 wherein the host processor and the plurality of packet processors communicate using a shared PCI (peripheral component interconnect) bus architecture.

5. The method of claim 1 wherein restoring the data structure includes resetting data values of said data structure with initial data values.

6. The method of claim 1 wherein the forwarding by the first packet processor of the at least one packet includes receiving the at least one packet at a port of the first packet processor and forwarding the received at least one packet to a second packet processor from the plurality of packet processors.

7. The method of claim 1 wherein the forwarding by the first packet processor of the at least one packet includes forwarding the at least one packet to an output port of the network device.

8. The method of claim 1 wherein the detecting comprises detecting setting of one or more error bits due to a parity error detected on a shared bus used for communicating between the host processor and the plurality of packet processors.

9. The method of claim 1, wherein the detecting comprises generating an interrupt to the host processor.

10. The method of claim 1, wherein the detecting comprises polling a register.

11. The method of claim 10, wherein said polling is programmed to occur periodically.

12. The method of claim 10, wherein said polling is programmed to occur depending on occurrence of a hotswap.

13. The method of claim 1, wherein the error condition is a timeout.

14. A network switching device comprising:
   a control processor with an associated memory; and
   a plurality of packet processors, including a first packet processor configured to forward one or more data packets received by the network switching device using forwarding information programmed by the control processor into a memory accessed by the first packet processor;
   said control processor configured to:
      store, in the associated memory, a set of data structures used for facilitating communication between the control processor and the plurality of packet processors;
      in response to detection of an error condition relating to communication between said control processor and one or more of said plurality of packet processors, identify the first packet processor affected by the error condition and perform a set of recovery actions for recovering from the error condition, the performing including disabling communication activity with the first packet processor, and restoring to an initial state a data structure from the set of data structures used for facilitating communication between the control processor and the first packet processor;
   said first packet processor configured to:
      while the set of actions is being performed by the control processor, forward at least one data packet received by the network switching device using the forwarding information programmed into the memory accessed by the first packet processor prior to detection of the error condition.

15. The device of claim 14 further comprising a shared bus configured to facilitate communications between the control processor and the plurality of packet processors.

16. The device of claim 15 wherein said shared bus is a PCI bus.

17. The device of claim 14 wherein the set of recovery actions comprises
   re-enabling communication activity with the first packet processor.

18. The device of claim 17 wherein said identified first packet processor includes at least one data register, wherein said control processor is further configured to store initialization data to said at least one data register in performing the set of recovery actions.

* * * * *